US012650034B2

(12) United States Patent
Davies

(10) Patent No.: US 12,650,034 B2
(45) Date of Patent: Jun. 9, 2026

(54) TOUCH BAR

(71) Applicant: Surelock McGill Limited, Wokingham (GB)

(72) Inventor: Glen Davies, Wokingham (GB)

(73) Assignee: Surelock McGill Limited, Wokingham (GB)

( * ) Notice: Subject to any disclaimer, the term of this patent is extended or adjusted under 35 U.S.C. 154(b) by 114 days.

(21) Appl. No.: 18/425,059

(22) Filed: Jan. 29, 2024

(65) Prior Publication Data

US 2024/0337135 A1 Oct. 10, 2024

(30) Foreign Application Priority Data

Mar. 29, 2023 (GB) ...................................... 2304584
Jan. 19, 2024 (GB) ...................................... 2400755

(51) Int. Cl.
*E05B 65/10* (2006.01)
*E05B 47/00* (2006.01)
*E05B 47/06* (2006.01)

(52) U.S. Cl.
CPC ...... *E05B 65/1046* (2013.01); *E05B 47/0012* (2013.01); *E05B 47/0607* (2013.01); *E05B 65/1053* (2013.01); *E05B 65/1086* (2013.01); *E05B 65/1093* (2013.01); *E05B 2047/0017* (2013.01); *E05B 2047/0023* (2013.01)

(58) Field of Classification Search
CPC ............... E05B 65/106; E05B 65/1046; E05B 65/1053; E05B 65/1066; E05B 65/1073; E05B 65/108; E05B 65/1093; E05B 47/0657; E05B 47/0661; E05B 47/0665; E05B 47/0669; E05B 47/0673; E05B 17/2069; E05B 47/0607; Y10T 292/0908; Y10T 292/0909; Y10T 292/091
See application file for complete search history.

(56) References Cited

U.S. PATENT DOCUMENTS 4,819,976 A * 4/1989 Bert ........................ E05B 65/104
292/48
5,011,199 A 4/1991 Lowe et al.
5,085,475 A 2/1992 Austin et al.
(Continued)

FOREIGN PATENT DOCUMENTS

EP 2921618 A1 * 9/2015 ......... E05B 65/1053
EP 3219885 A1 * 9/2017 ......... E05B 65/1053
EP 2474692 B1 * 6/2018 ......... E05B 65/1053

*Primary Examiner* — Christine M Mills
*Assistant Examiner* — Peter H Watson
(74) *Attorney, Agent, or Firm* — Michael S. Hargis; Stites & Harbison PLLC

(57) ABSTRACT

A bolt restraint mechanism for restraining a bolt of a bolting mechanism. The bolt restraint mechanism includes a bolt moveable between thrown and retracted positions and a catch plate having an aperture through which the bolt extends. The catch plate is biased to pivot such that a restraint surface of the aperture pushes against the bolt to restrain movement of the bolt. A release trigger is arranged such that when depressed the release trigger pushes against the catch plate to pivot thereby releasing the restraint surface from pushing against the bolt to release the bolt. The catch plate may be biased such that when the restraint surface pushes against the bolt to restrain movement of the bolt, the catch plate is non-orthogonal to the bolt.

28 Claims, 27 Drawing Sheets

(56) References Cited

U.S. PATENT DOCUMENTS

| | | | | |
|---|---|---|---|---|
| 7,536,885 | B1 | 5/2009 | Ross et al. | |
| 2011/0047874 | A1* | 3/2011 | Lowder | E05B 65/1053<br>49/31 |
| 2013/0001960 | A1* | 1/2013 | Tien | E05B 17/2003<br>292/96 |
| 2015/0184426 | A1* | 7/2015 | Arlinghaus | E05B 65/108<br>292/138 |
| 2016/0333621 | A1* | 11/2016 | Lehner, Jr. | E05F 11/54 |
| 2021/0040775 | A1* | 2/2021 | Kusanale | H02K 7/06 |
| 2021/0285260 | A1* | 9/2021 | Chen | E05B 65/1006 |
| 2021/0381278 | A1* | 12/2021 | Lin | E05B 65/108 |

* cited by examiner

Neutral
204

Retracted (motorised)
220
230
245
264b
264a
210
208
258

230
245
244
208

246
241

Fig. 12A
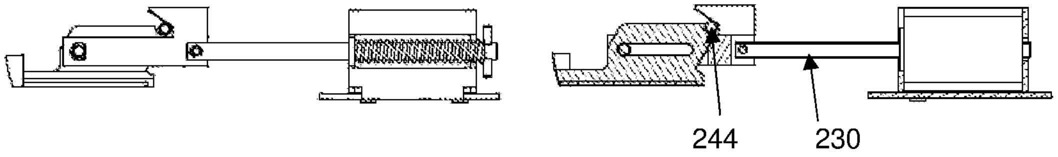
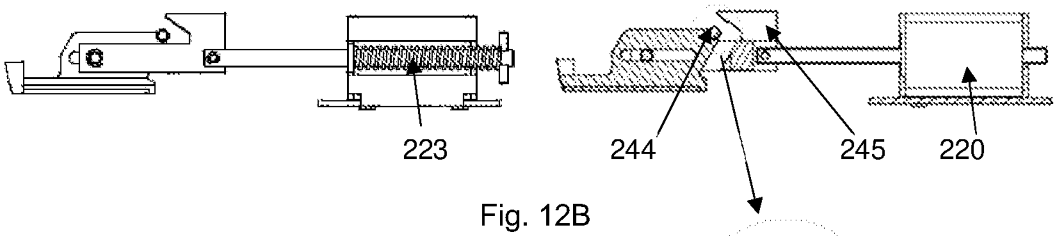
Fig. 12B
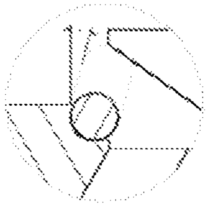
Fig. 12C
Fig. 12D
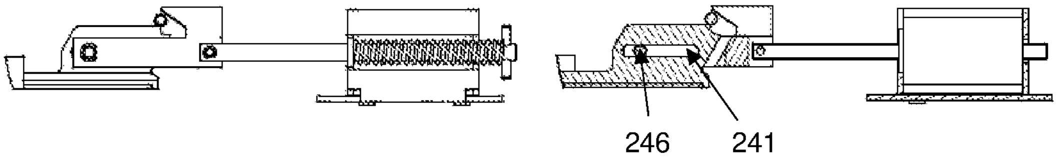
Fig. 12E
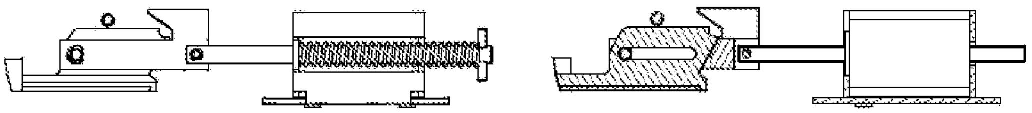

Fig. 16A
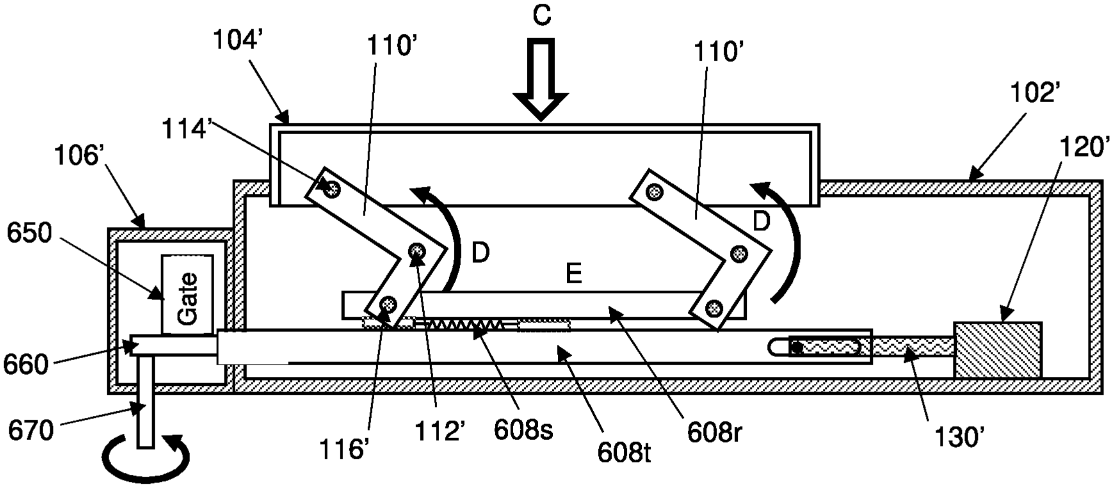
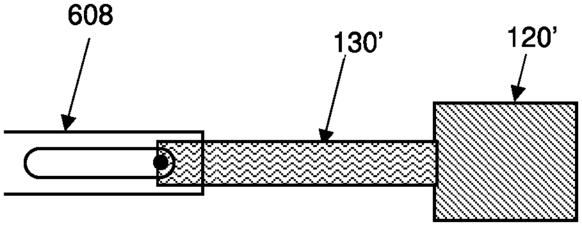
Fig. 16B
Fig. 16C
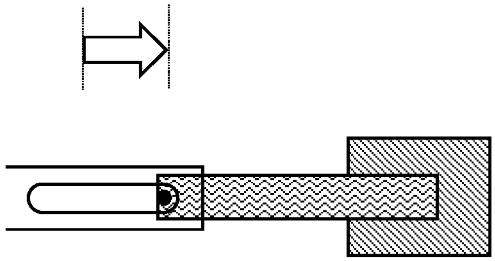
Fig. 16D
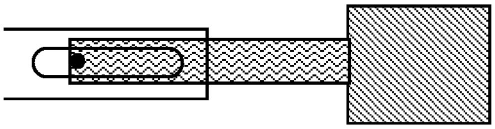

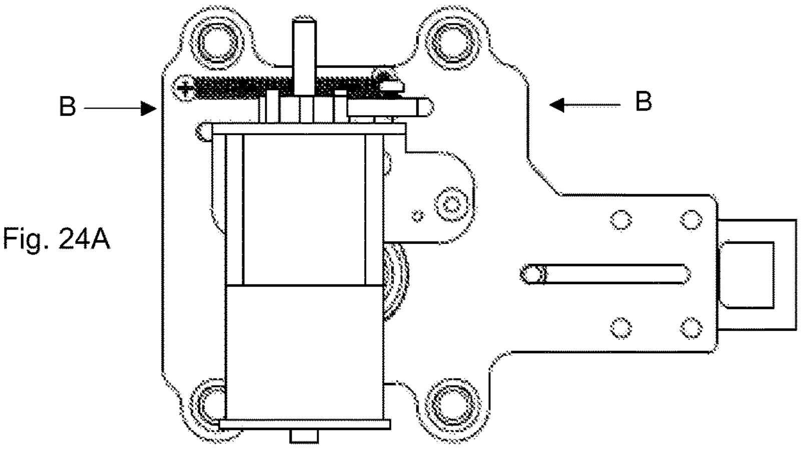
Fig. 24A
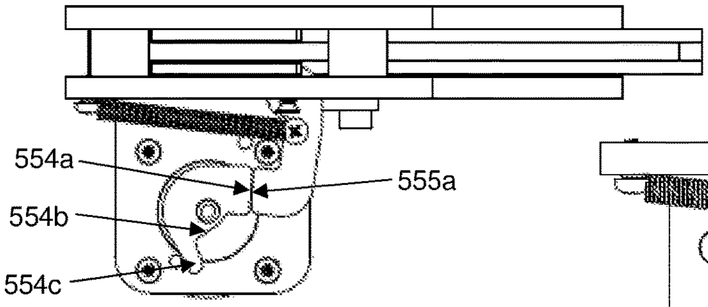
Fig. 24B
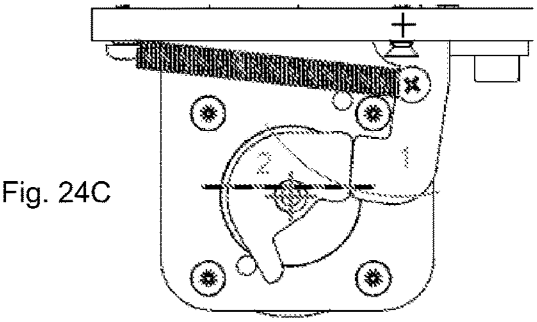
Fig. 24C
Fig. 24D
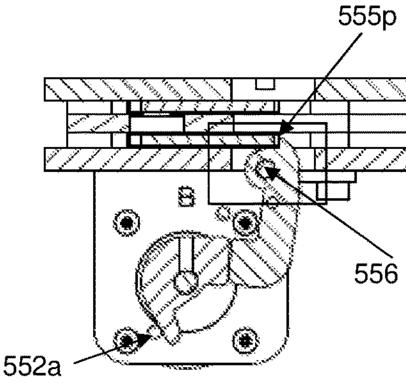
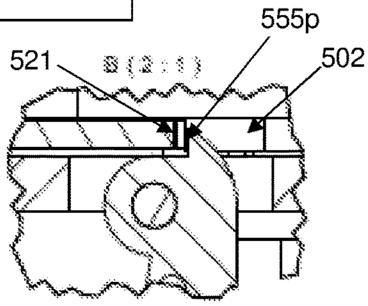
Fig. 24E Fig. 26A
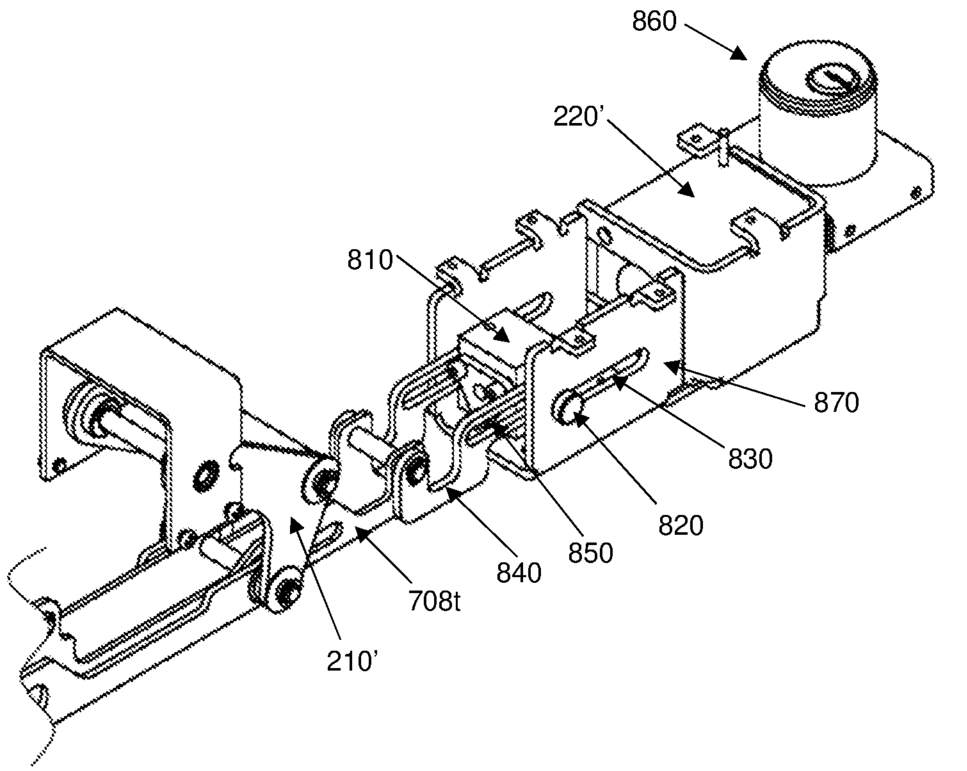
Fig. 26B
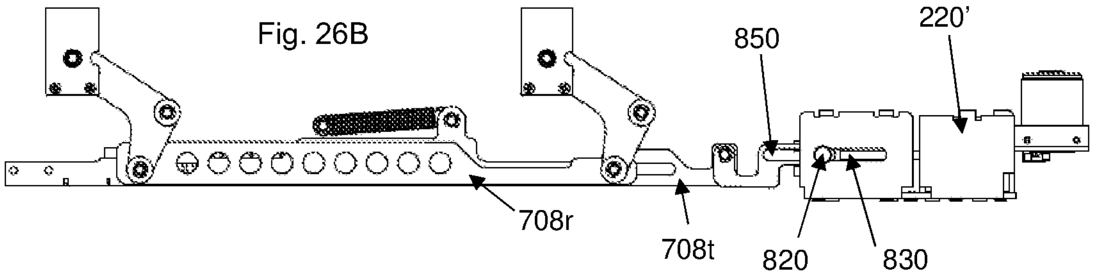
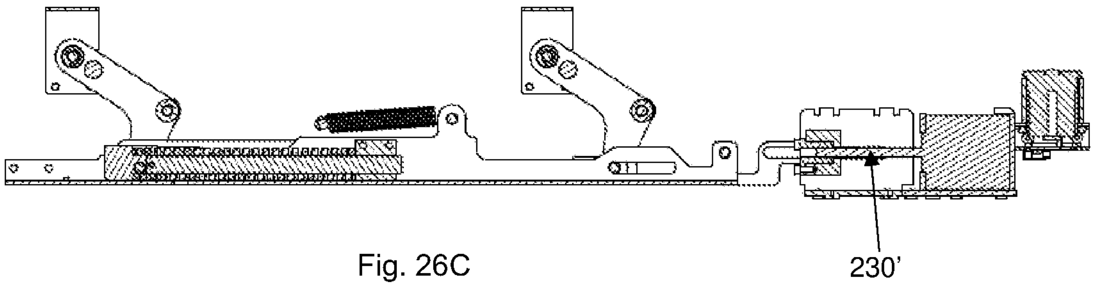
Fig. 26C

TOUCH BAR

This application claims priority to United Kingdom application number 2304584.2, filed Mar. 29, 2023, and United Kingdom application number 2400755.1, filed Jan. 19, 2024, the disclosures of which are incorporated herein by reference in their entirety.

TECHNICAL FIELD

The present invention relates to a touch bar assembly for releasing a bolt that secures a door. In particular, the touch bar assembly may be fitted with single or multi-point bolting mechanisms for securing and permitting release of emergency exit doors. The touch bar assembly may also be known as a panic bar assembly or panic exit device.

BACKGROUND

Emergency exit doors on buildings often include an emergency release mechanism, such as a touch bar or touch bar assembly, or push pad, on the face of the door inside the building. FIG. 1 shows such a touch bar assembly 20 on door 10. The touch bar assembly 20 is coupled to a bolting mechanism 30 which actuates one or more bolts to secure the door. In the arrangement of FIG. 1 three bolts 40 are included (only two are shown) which engage in keeps or strike plates 50 at or in the door frame or floor. In FIG. 1 the door is shown as may be seen on the inside of the building and is hinged on side 60, opening in the direction of arrow B with an opening side 65. When pushed, such as in the direction of arrow A, the touch bar of the touch bar assembly releases the one or more bolts from positions in which the bolts secure the door closed to released positions in which the door is free to open. The use of touch bars or push pads is to allow rapid exit from a building in emergency situations while maintaining the door secured from the outside. Touch bars provide a visible means for releasing the door because they often extend across the whole width of the door or a significant portion thereof. Touch bars are considered to provide faster release of the door than a conventional door handle because the touch bar is easier to identify and actuation is a simple pushing action. Conversely, door handles are more difficult to locate, especially if the lighting is poor in the emergency situation where smoke may be present, and it may not be clear which way it is required to turn the door handle to release the bolts. The result is that touch bars are often preferred on emergency exit doors.

However, the case and speed with which emergency exit doors may be opened may also cause security problems from inside the building. For example, large shops and stores may include emergency exit doors to allow escape from the building by anyone who requires a rapid escape. Thieves and persons stealing goods from stores may use the touch bar to quickly escape from the store with goods. In some stores the emergency exit doors may not be alarmed and by leaving through the emergency exit doors the thieves may avoid security personnel on the main entrance doors to the store. Hence, it is desirable to limit egress from emergency exit doors when there is not an emergency. One such way is to include a time delay on the touch bar assembly.

U.S. Pat. No. 5,011,199 describes a panic exit device having an exit delaying mechanism. The mechanism obstructs movement of a linkage coupled to a latchbolt. The latchbolt is manually actuated by a push pad and includes an arm which normally pivots to actuate the linkage. An initial, limited movement of the linkage actuates a switch. The switch activates a time delay, which after a specified time interrupts power to a solenoid. The solenoid, when normally powered, forces a rod carrying a roller into the path of the linkage preventing full movement of the arm and retraction of the latchbolt. When de-energized, the rod and roller are retracted permitting pivoting movement of the arm and movement of the latchbolt to its unlatched position. U.S. Pat. No. 5,085,475 describes a similar exit delaying mechanism for a panic exit device.

Recently it has become desirable to enable access through doors, including emergency exit doors, to be controlled with access control systems that provide electronic control, such as based on user authorisation or time of day etc. Prior art methods have been made to incorporate access control into touch bars for emergency exit doors. For example, the access control system may operate in delayed exit mode during the hours a shop or store is open for sales, but may also provide access through the door for users having authorization, such as employees carrying an access control card (swipe card). A prior art door exit device is described in U.S. Pat. No. 7,536,885 B1 which includes manual egress, delayed egress and motorised egress such as is compatible with an access control system. However, such a device is complex and is not easily added or the functionality changed or upgraded once the door exit device has been fitted to a door. It may also be desirable that the door and exit device be able to withstand significant force preventing egress even when the force on the exit device becomes large. It may further be desirable for the door to meet closing requirements to withstand blasts and tornados and meet higher life-safety egress requirements than provided by the prior art.

SUMMARY OF THE INVENTION

The present invention provides a touch bar assembly for providing higher life-safety egress requirements on high performance doors. Such doors may be secured by heavy-duty single-point or multi-point bolting systems having longer bolt throw lengths for deep engagement to maintain the door closed in more severe situations such as a blast or tornado. A minimum bolt thrown length of around 25 mm or 1 inch may be required. The bolting system may also be heavily sprung to throw the bolts with a force of 40 N or more, so as to provide positive engagement of all bolts upon door closure, overcoming misalignments between bolts and keeper or frame to secure the door closed. The touch bar assembly of the present invention also requires low release forces allowing the door to be readily opened. For example, release forces of 67N or less when the door is unloaded, or 220 N or less when the door is loaded. That is, when a load (up to 1000N) is applied central to the door and perpendicular to the door face, the door opens when a force of 220N or less is applied to the touch bar.

The touch bar assembly achieves this light-to-release and strong-to-close by incorporating an operating geometry that takes the pushing force on the touch bar through a pivoting curved motion to a lateral driving bar. The driving bar, also known as an action slider, includes a damage limiting safety spring and connects to an interface assembly or gearbox which converts the lateral movement of the driving bar to a rotational drive to release one or more bolts. The rotational drive to the bolts may be applied to different bolting systems, such as those having greater throws, and for either surface-mounted or mortices fitted bolting systems. Preferably, for additional security, deadlocking of the bolts may be provided.

In one embodiment the present invention provides a touch bar assembly for releasing a bolt, the touch bar assembly comprising: a touch bar for actuation by a user; an action slider coupled to the touch bar, the touch bar configured for lateral motion; and a cam coupled to the action slider and arranged to couple the lateral motion of the action slider to a rotational motion to drive the bolt between an extended position and a retracted position.

The action slider may comprise a receiving portion coupled to the touch bar and arranged to be driven by a driving force from a user applied at the touch bar, and a transmitting portion for coupling motion of the action slider to the cam. The action slider may further comprise a safety spring coupled between the receiving portion and transmitting portion, the safety spring arranged to absorb user force on the touch bar assembly when retraction of the bolt is blocked. The safety spring may also be configured to return the touch bar to the start position if the touch bar is depressed when retraction of the bolt is blocked. The safety spring absorbs the force by the spring extending between the receiving portion and the transmitting portion of the action slider. The safety spring allows the touch bar to be depressed even when retraction of the bolts is blocked. In such a case the safety spring may prevent injury to a user and damage to the touch bar assembly. Preferably, only one safety spring is included such that the touch bar assembly can be compact.

The receiving portion of the action slider may be coupled to the touch bar at two positions spaced apart along the length of the receiving portion. The pair of spaced apart couplings is such that the touch bar moves equally along its length if its depressed at one end.

The safety spring may have a spring rate of 10-20 N/mm and preferably 14-18 N/mm such as around 16 N/mm.

The receiving portion of the action slider may have a channel in which the transmitting portion is configured to slide. The transmitting portion may be formed with a channel having a U-shaped cross-section. The receiving portion may comprise a pair of elongate plates outside of the transmitting portion and configured to move parallel to the U-shaped channel of the transmitting portion. A housing or base having a U-shaped channel houses the action slider, including the receiving portion, transmitting portion and safety spring.

The safety spring may be comprised in a channel, such as the U-channel, in the transmitting portion.

The touch bar may be movable from an extended position, in which the touch bar extends from a housing of the assembly ready to be pushed, to a depressed position, in which the touch bar has been pushed in to the housing and may have released bolts or operated safety spring. The touch bar assembly may further comprises a return spring to bias the touch bar to return the touch bar from the depressed position to the extended position, and wherein the safety spring is stronger than the return spring. That is, the safety spring requires greater force to be compressed than the return spring requires to be overcome.

The touch bar assembly may further comprise a housing, wherein the touch bar is coupled to the action slider such as at the receiving portion thereof by cranks arranged to rotate at pivots on the housing.

The cranks may be pivotably coupled at first ends to the touch bar and at second ends to the receiving portion of the action slider, the pivotable couplings to the touch bar, receiving portion of action slider and housing may be arranged in an L-shape formation, wherein the distance from the pivotable coupling to the housing to the pivotable coupling to the touch bar is preferably greater than the distance from the pivotable coupling to the housing to the pivotable coupling to the receiving portion of the action slider. By distances, we mean distances between the pivot axes.

The ratio of the distance from the pivotable coupling to the housing to the pivotable coupling to the touch bar and the distance from the pivotable coupling to the housing to the pivotable coupling to the receiving portion of the action slider may be greater than 1.5 such as between 1.6 and 1.8 and preferably around 1.7.

The L-shape formed by the pivotable couplings to the touch bar, receiving portion of the action slider and housing is an L-shape and preferably has an angle of greater than 85° such as between 85° and 100°, or between 92° and 96° such as about 94°.

If no safety spring is provided then the transmitting portion and receiving portion of the action slider may be formed as one.

The touch bar assembly may further comprise a single or multi-point bolting mechanism for bolting a door, wherein the bolting mechanism may be configured to be rotationally driven by the cam to retract the one or more bolts.

The cam may be configured such that rotation of the cam drives rotation of the bolting mechanism by a spindle coupled through the cam to the bolting mechanism, such as by an 8 mm square spindle. Alternatively, the cam may be configured to accept and drive other sizes of spindle such as ⅜ inch (9.5 mm) square The cam is configured such that it turns through greater than 45° on driving by the actions slider to release the bolts.

The bolting mechanism may comprise a deadlock configured to selectively block retraction of the one or more bolts by the touch bar.

The bolting mechanism may comprise a bias to throw the one or more bolts, the bias configured to throw the bolts with a force of 40 N or more. A separate bias in the bolting mechanism to that of touch bar has advantages that stronger throwing force can be provided.

The cam may be coupled to the action slider. The action slider may have a longitudinal axis of motion through the centre of the action slider. The longitudinal axis of motion may be coincident with the rotation axis of the cam. It is preferable to have the axes aligned to maximise efficiency of driving.

The cam may be coupled to the action slider by a slide arm forming an offset linkage. There may be further provided one or more parallel first guides arranged to guide the slide arm to move laterally, for example, without rotation, when driven by the action slider. The slide arm may comprise a second guide transverse to the one or more first guides. A lobe of the cam may have a pin or roller arranged to move along the second guide as the slide arm, driven by lateral movement of the action slider, rotates the cam.

The slide arm may be configured to slide between two plates and the first guides are slots in the plates.

The cam may be arranged to be driven by the action slider to rotate by an angle of 50-70°, or more preferably 55-65°, such as by around 60°, to move the bolt or bolts from a thrown position to the retracted position.

The cam may be arranged to be driven through a transverse position in which the cam is oriented transversely (such as at) 90° to the lateral axis of motion of the action slider, and preferably the mid-point of the rotation of the cam for moving the bolt or bolts from a thrown position to the retracted position is at the transverse position. This arrangement is half way between top-dead-centre and bottom-dead-centre and provides easiest turning of the cam.

The touch bar assembly may further comprise a gating assembly arranged to block rotation of the cam and lateral motion of the action slider such as the transmitting portion of the action slider.

The gating assembly may be arranged to be driven by an actuator to drive part of the gating assembly in to the path of the cam to block rotation of the cam.

The gating assembly may comprise a blocking finger and a blocking rotor, the blocking finger may be biased out of the path of the blocking rotor and the actuator may be a motor configured to drive the blocking rotor to rotate the blocking finger into the path of the cam to block the cam.

The motor may be a stepper motor comprising a brake to stop the motor from rotating.

The blocking finger may be arranged to rotate about a pivot positioned between the blocking rotor and the cam. The blocking rotor may have a first flat blocking surface and the blocking finger have a second flat blocking surface, wherein the blocking rotor is configured to be rotated by the motor to pivot the blocking finger and push the first flat blocking surface of the blocking rotor to butt against the second flat blocking surface of the blocking finger. The first flat face may be at a tangent to rotation of the blocking rotor.

When the flat blocking surfaces move apart there is a contact point or line on the blocking rotor at which the stopping finger contacts the blocking rotor, the contact point and direction of force through the contact point may be offset from the axis of blocking rotor by a small distance, such as less than half, less than a third or less than a quarter of the mean radius of the rotor. The blocking finger preferably has a leverage ratio of greater than 2:1 or 3:1, such as around 3.3:1. That is, the distance from the pivot of the blocking finger to the contact point is greater than the distance from the pivot to the point the finger blocks the cam of the interface assembly. The combination of the contact point and direction of force being close to the as axis of the blocking rotor and the high leverage ratio of the blocking finger means that it difficult to overcome the brake of the motor.

The touch bar assembly may comprise a first motor for driving a gating or blocking action to selectively block rotation of the cam and a second motor for driving the lateral movement of the action slider, to retract the bolt.

The first motor and second motors may be arranged at opposite ends of the touch bar assembly.

The touch bar assembly may further comprise an electrically or pneumatically powered retraction actuator coupled to the action slider for driving the action slider, such as the transmitting portion of the action slider, to a retracted position for retraction of the bolt.

The cam may be driven at a first end of the action slider and the retraction actuator may be coupled to a second end of the action slider opposite to the first end.

The retraction actuator may be a motor arranged to drive a motor rod between an extended position and a retracted position, wherein the motor rod is configured to retract the action slider to retract the bolt.

The touch bar assembly may further comprise a lost-motion coupling between the motor rod and action slider. The lost motion coupling may comprise a carriage rod guided by a slot, the carriage rod arranged to be driven by the motor rod to move the action slider between an extended and retracted position. The slot and carriage rod may have lost-motion there between such that when the action slider is in the extended position, the action slider and carriage rod are configured to be driven to the retracted position by user force on the touch bar.

In another embodiment the present invention provides a touch bar assembly for releasing a bolt. The touch bar assembly of this embodiment may be configured to provide blocking of retraction of the bolt, manual egress and motorised egress, all by operation of a single motor. The touch bar assembly comprises: a touch bar for actuation or pushing by a user; an action slider or action bar coupled to the touch bar for retracting the bolt; a motor arranged to drive a motor rod between a retracted position, a neutral position and a blocking position, the motor rod coupled to the action slider by a coupling comprising a gate, wherein movement of the motor rod from the neutral position to the blocking position moves the gate to a blocking configuration blocking retraction of the action slider, and the coupling couples motion of the motor rod from the neutral position to the retracted position into retraction of the action slider to retract the bolt. The action slider may be a bar or rod or may take other shapes such as comprising cut-outs to accommodate springs. The motor in combination with the motor rod sets in which of three modes the touch bar assembly is operating, namely: blocking retraction of the one or more bolts, permitting retraction of the one or more bolts, and retracting the one or more bolts. Preferably, this single motor is the only component drawing electrical power that provides movement for selection between the modes. Additionally, the motorised function allows delayed egress to be performed. The motor, motor rod and coupling to action slider are located at one end of the touch bar assembly. This allows the motor and associated functionality to be retrofitted to an existing touch bar assembly already deployed on a door, thereby allowing later existing touch bars to be upgraded.

The movement of the motor rod from the blocking position to the neutral position may move the gate to an open position releasing the action slider for manual or motorised retraction of the bolt.

The motor may comprise a brake to prevent movement (up to a limit) of the motor rod when in the blocking position.

The gate may be arranged such that in the blocking configuration, the gate reduces a user force transmitted from the action slider to the motor rod. The combination of the gate and the motor brake resists movement of the action slider, preventing egress.

The gate may comprise a stopping bar, and the gate may be configured such that in the blocking configuration the stopping bar blocks movement of the action slider. For example, by blocking or sitting in its path.

The stopping bar may slide in a slot and may be biased away from a blocking configuration, that is towards an unblocked configuration. The action slider may be configured to move in a first direction as its retracts the bolt. The slot may restrict the direction of movement of the stopping bar and may be angled to be less than 90° transverse to the movement direction of the action slider. The slot may be angled between 6° and 85°, or more preferably between 70° and 80°, or even more preferably around 75°, transverse to the movement direction of the action slider. The angle of the slot may be used to determine how much force applied by user at the touch bar is passed on to the motor. This in combination with safety springs prevents the motor brake from being overcome and the motor from being damaged.

The action slider may comprise a blocking surface against which the stopping bar bears in the blocking configuration.

The coupling may comprise a carriage coupled to the motor rod and the action slider. The carriage may have a driving surface arranged such that on moving the motor rod to the blocking position the driving surface bears against the stopping bar to move the gate, or stopping bar, to a blocking configuration. The driving surface may be a ramp or sloping surface arranged to pull the stopping bar down to block retraction of the action slider as the motor rod pushes the carriage and moves to the blocking position.

The ramp or sloping surface may have an angle of between 25° and 55° to the movement direction of the action slider. The ramp or sloping surface may have an angle of between 30° and 40°, or more preferably around 35° to the movement direction of the action slider.

The carriage may couple motion of the motor rod from the neutral position to the retracted position to pull on the action slider to retract the bolt.

The coupling may be configured with lost motion between the carriage and the action slider such that movement of the action slider by actuation of the push pad does not move the motor rod. The lost motion may be provided by a rod of the carriage moving in a slot of the action slider.

The carriage may comprise a channel in which the action slider extends.

The motor rod may be biased from the blocking position to the neutral position. For example, such that when power is lost the motor rod moves to the neural position ready for manual retraction of the bolt The action slider may be coupled to the touch bar by cranks. The cranks may be configured such that on pushing the touch bar the cranks rotate to translate the action slider.

The action slider may comprise a receiving portion coupled to the touch bar to receive a driving force from a user applied at the touch bar, and may comprise a transmitting portion coupled to the coupling for movement by the motor rod. The action slider may comprise one of more safety springs between the receiving portion and transmitting portion, the safety springs arranged to absorb, such as by compressing, the user force when the gate is in the blocking configuration.

The one or more safety springs may be configured to absorb a user force to protect the mechanism and motor. By protecting the mechanism, parts of the mechanism do not become bent or damaged and even under high user force reliable operation of the touch bar is maintained, as required for a safety device.

The safety springs may compress until the touch bar bottoms out (fully depressed) so that extra force does not push it any further. The stopping bar and motor brake may maintain their position, preventing egress. In delayed egress mode, with a sensor monitoring for touch bar movement, by partially and then fully depressing the touch bar, a controller may be alerted and a timer begins to countdown. When this time period expires the motor rod may be powered back in a controlled manner pulling the coupling to the neutral position. The load of the safety springs will force the action slider to push the stopping bar clear, allowing egress. Alternatively, when the time period expires power is removed from the motor entirely releasing its brake. The bias springs pull the motor rod and coupling towards the neutral position and the load of the safety springs will force the action slider to push the stopping bar clear, allowing egress.

The touch bar may further comprise the bolt or a bolting mechanism including the bolt.

The present invention also provides a door or opening comprising the touch bar assembly set out herein.

BRIEF DESCRIPTION OF THE DRAWINGS

Embodiments of the present invention, and aspects of the prior art, will now be described with reference to the accompanying drawings, of which:

FIGS. 12A, 12B, 12D, and 12E show components controlling the blocking and retraction functions during steps of egress, from blocking to retracted positions, when a load is continuously applied to the touch bar and power to the motor is removed or lost, in side view and cross-sectional view;

FIG. 12C is a partial enlarged view of the components controlling the blocking and retractions functions as shown in FIG. 12B;

FIGS. 16A-16D are schematic diagrams of the operation of the touch bar assembly according to the second embodiment of the present invention;

FIG. 24A is a top plan view of the modified interface assembly of FIG. 22, with blocking rotor of the gating assembly in the blocking position;

FIG. 24B is a side view of the modified interface assembly of FIG. 22, with blocking rotor of the gating assembly in the blocking position;

FIG. 24C is an enlarged side view of the modified interface assembly of FIG. 22, with blocking rotor of the gating assembly in the blocking position;

FIG. 24D is a section view of the modified interface assembly of FIG. 22, with blocking rotor of the gating assembly in the blocking position;

FIG. 24E is an enlarged section view of the modified interface assembly of FIG. 22, with blocking rotor of the gating assembly in the blocking position;

FIG. 26A is a perspective view of the rear motor and related features of the touch bar assembly according to the present invention;

FIGS. 26B and 26C are respectively side cross-sectional views of the rear motor and related features taken along the centreline and close to the edge of the housing;

DETAILED DESCRIPTION

Figure 1:
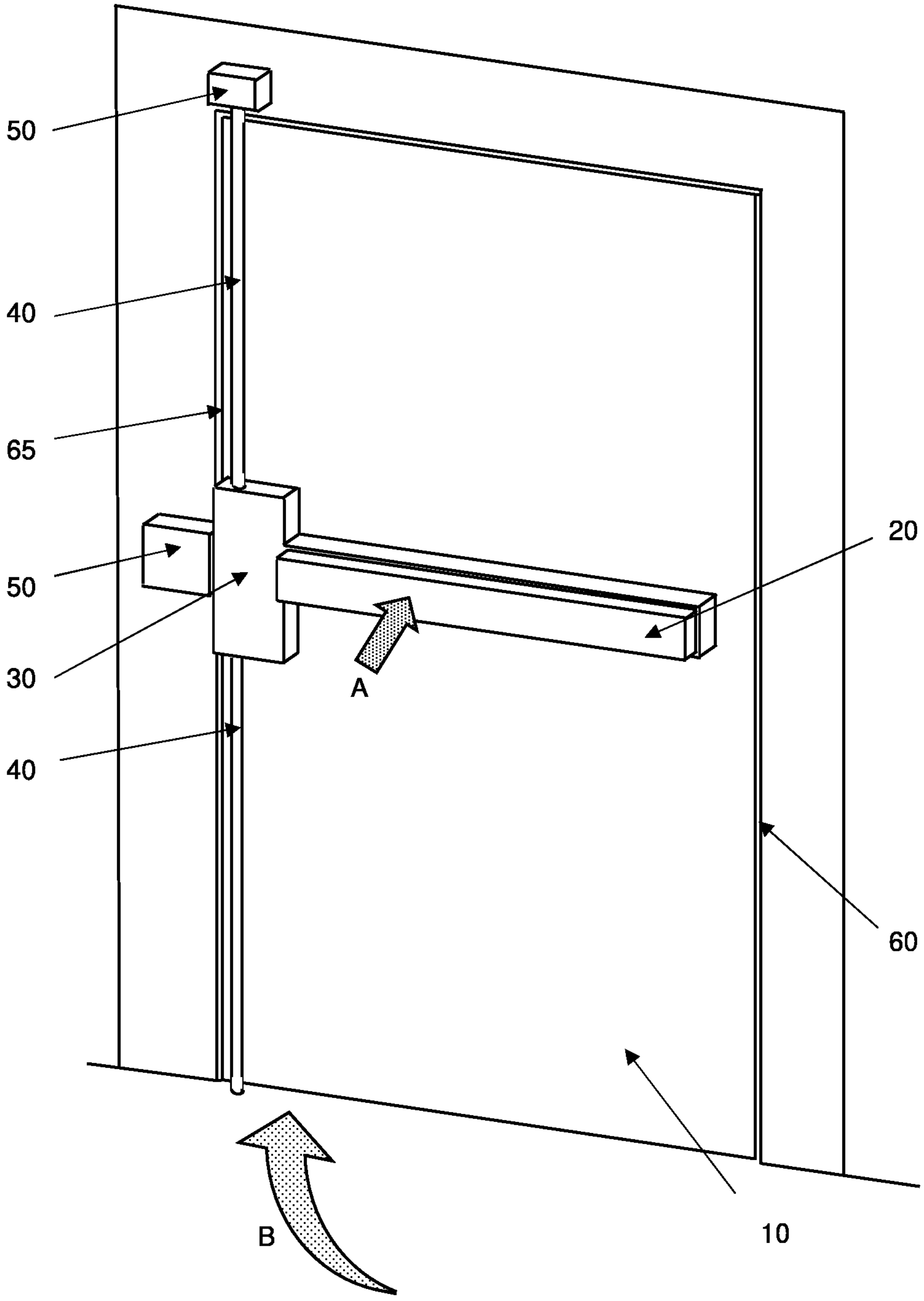
Fig. 1 (Prior Art)
FIG. 1 is a perspective schematic drawing of a door with a prior art touch bar assembly fitted.
Figure 2:
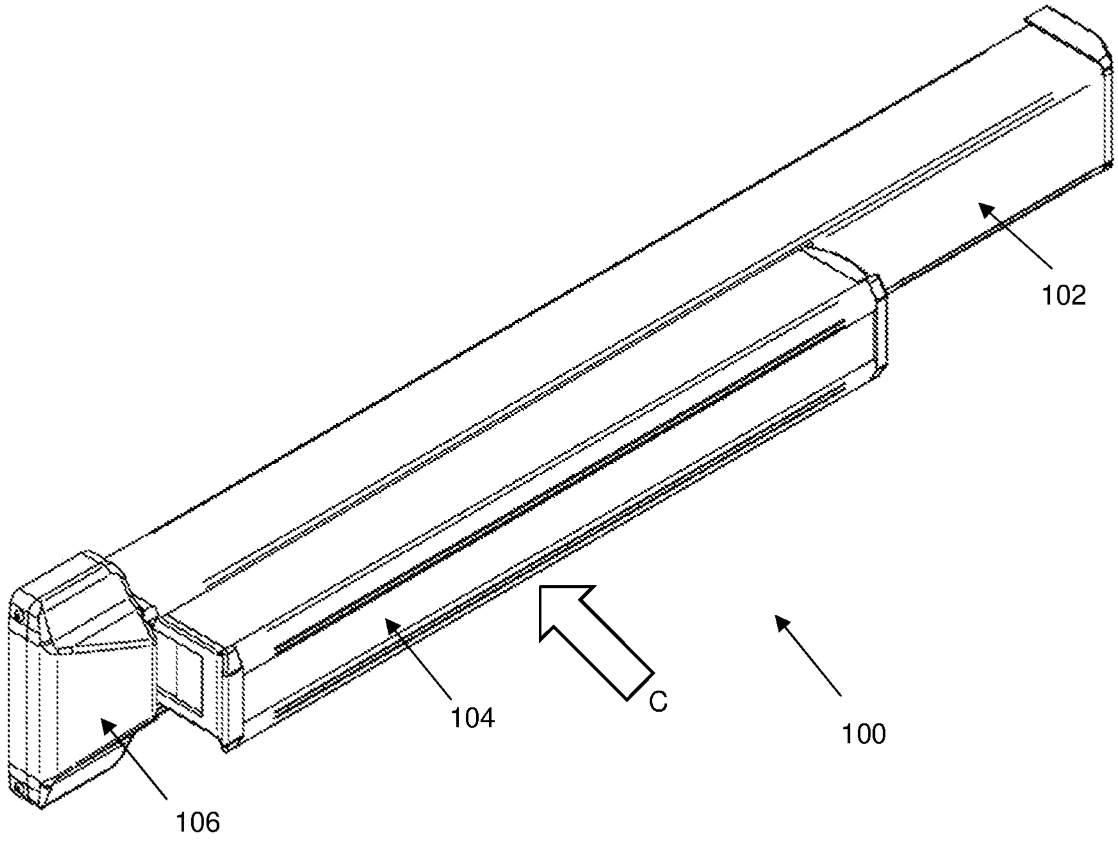
FIG. 2 is a perspective drawing of a touch bar assembly according to a first embodiment of the present invention.
Figure 22:
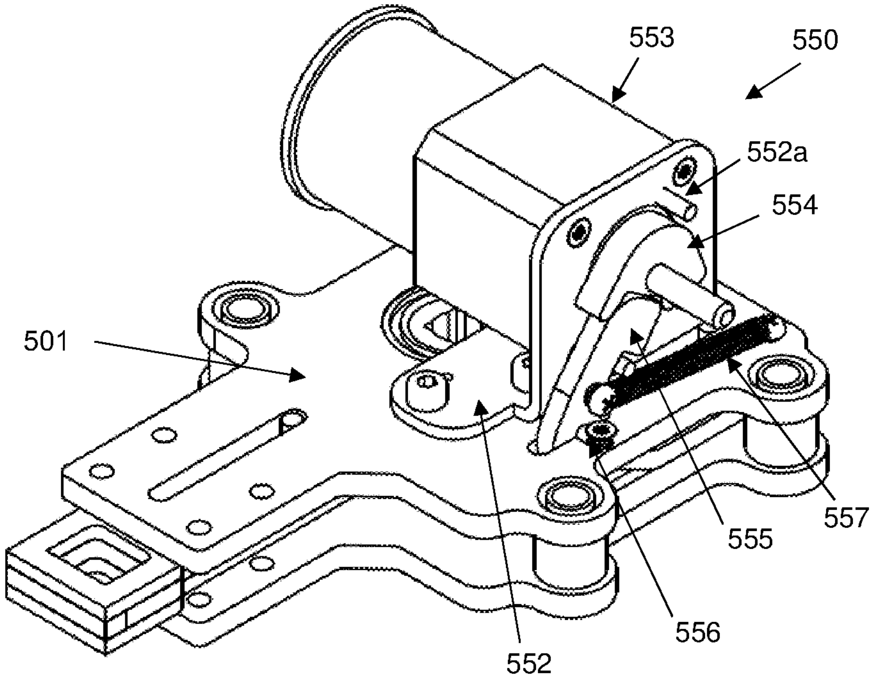
FIG. 22 is a perspective view of modified interface assembly comprising an electrically driven gating assembly which is configured to selectively block retraction of the bolt or bolts of bolting mechanism.

FIG. 22 is a perspective view of a touch bar assembly 100 according to the present invention. The touch bar assembly may be fitted to a door in a similar way to that shown in FIG. 1. The touch bar assembly 100 comprises a base housing 102 and a touch bar 104. The base housing may be an elongate rectangular housing, that may have a width no greater than the width of a door. The assembly also comprises a touch bar 104. The touch bar 104 is an actuatable part of the assembly. The touch bar 104 may extend the full width or part of the width of the base housing 102. For example, as shown in FIG. 2 the touch bar extends to a length greater than half the length of the housing. The touch bar 104 is also rectangular and extends from the front face of the base housing 102. When depressed the touch bar 104 retracts into the base housing 102. The touch bar assembly 100 may also comprise a connection cover 106 which is part of the housing and covers the connection between the mechanism of the touch bar assembly and the bolting mechanism that is operated by the touch bar assembly 100. The bolting mechanism is not shown in FIG. 2 but, for example, may be located behind the connection cover 106 and may drive one or more bolts in a corresponding manner to bolting mechanism 30 in FIG. 1.

Actuation of the touch bar 104 of the assembly 100 is by pushing or depressing the touch bar in the direction shown by arrow C such that it is partly retracted into the base housing. Pushing or depression of the touch bar 104 acts to retracts bolts such as the bolts 40 shown in FIG. 1.

The touch bar assembly 100 according to the present invention may provide functions of manual retraction of one or more bolts and motorised retraction of one or more bolts. Delayed egress may also be included which may be motorised or manually operated. The touch bar assembly of the present invention includes a blocking action that blocks the touch bar from actuating the bolts. This blocking action remains until released by the motor or power to the motor is turned off.

Figure 3A:
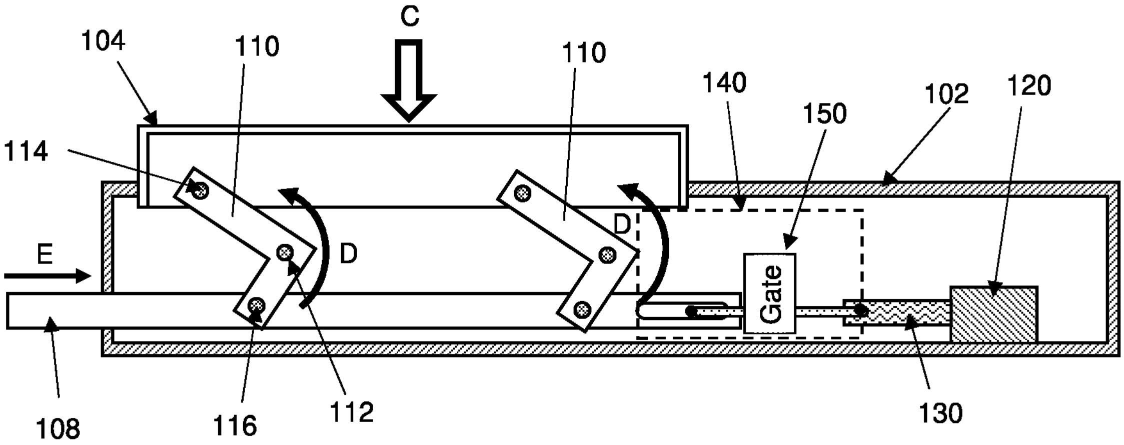
FIGS. 3A-3D are schematic diagrams of the operation of the touch bar assembly according to embodiments of the present invention.

FIGS. 3A-3D are schematic diagrams of the mechanism of the touch bar assembly 100. In FIG. 3A the touch bar assembly can be seen to include base housing 102 and touch bar 104 for depressing by a user in a direction as indicated by arrow C. The touch bar assembly 100 further comprises action slider 108 or action bar which is coupled to the touch bar 104 by a pair of cranks 110. The cranks may be L-shaped cranks. Alternatively, the cranks may be bellcranks or other suitable cranks or arms for providing the required linkage. The cranks are mounted in the housing to rotate about pivot 112. The cranks are connected to the touch bar at pivots 114 towards one end of the L-shape. The cranks are connected at the other end to the action slider 108 at pivots 116 which is at the other end of the L-shape. When the touch bar 104 is pushed in the direction indicated by arrow C the cranks rotate in the direction of arrows D which results in retraction of action slider 108 in the direction of arrow E. By having the touch bar 104 coupled to the action slider 108 by cranks 110 with a pin based pivot and full bearing face, as the touch bar is depressed it may move through a slight arc. Conventional touch bars may move perpendicular to a face of the door without the arc movement. The movement of such conventional touch bars is achieved through a pin in a slot arrangement. The crank and arc movement described herein experiences less friction for a smoother action as compared to conventional touch bars.

Figure 3B:
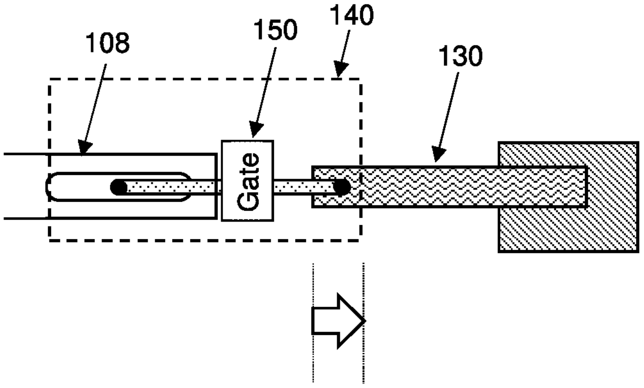
Figure 3C:
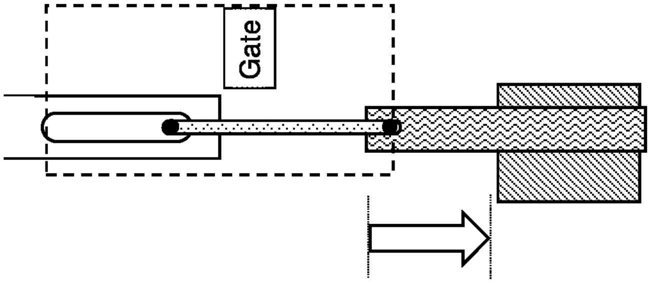
Figure 3D:
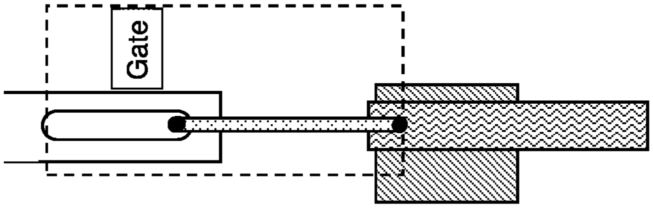

The action slider 108 is further connected by a coupling 140 to a motor rod 130 which is moved by a motor 120. The coupling 140 comprises a gate 150 which may be used to control or restrict movement of the action slider 108. Further detail on the coupling 140 and gate 150 is described with reference to FIGS. 3B-3D. The motor rod 130 is moved by motor 120 when controlled to do so and when power is applied to the motor. The motor 120 is arranged to drive the motor rod 130 from a retracted position to a neutral or mid-position and further to a blocking position. The motor 120 is also arranged to reverse the movement of the motor rod 130. FIG. 3B shows the motor rod 130 in a blocking position. With the motor rod in the blocking position the gate 150 is in a blocking configuration. Here the gate 150 blocks retraction of the action slider. As the slider is coupled to a bolting mechanism, the blocking configuration thereby blocks retraction of the bolt or bolts of the bolting mechanism. FIG. 3C shows the motor rod 130 has been moved further by the motor. The motor rod 130 is now at the neutral or mid-position. In this position the gate is moved from the blocking configuration such that it is no longer blocking the path of the action slider 108. The action slider 108 can now be retracted to retract the bolt or bolts of the bolting mechanism. The retraction of the action slider 108 may be by manual depression of the touch bar 104 or may be by further driving of the motor and motor rod. FIG. 3D shows the motor rod has been driven to a retracted position by the motor. As the motor rod is moved by the motor to the retracted position, the coupling 140 couples the retraction of the motor rod to the action slider to retract the action slider. The retraction of the action slider retracts the bolt or bolts of the bolting mechanism. There are various possible mechanisms for the coupling between the motor rod and action slider such that movement of the motor rod to and from the blocking position moves the gate to and from a blocking configuration and also couples movement of the motor rod between the neutral position and the retracted position to movement of the action slider. An embodiment of such a mechanism will be described below.

Figure 4:
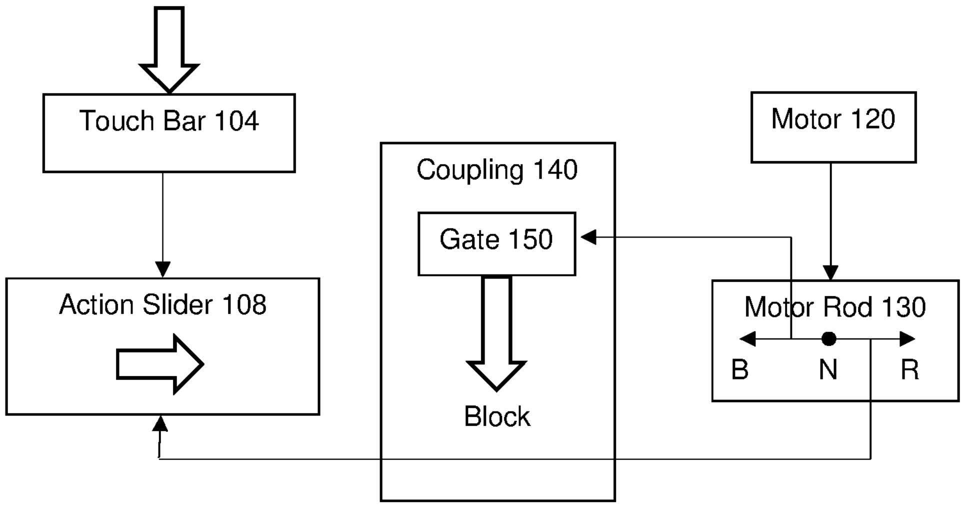
FIG. 4 is a block diagram showing the relation between components of the touch bar assembly of FIG. 3.

FIG. 4 is a flow chart summarizing the operation of the touch bar assembly of FIG. 3. The position of the motor rod 130, which is driven by the motor 120, provides some control over movement of the action slider 108 and position of the gate 150 of the coupling 140. The motor may move the motor rod 130 from a blocking position (B in FIG. 4) to a neutral position (N in FIG. 4) and further to a retracted position (R in FIG. 4). Movement of the motor rod 130 to the blocking position moves the gate to the blocking configuration. In the blocking configuration retraction of the action slider 108 is blocked. When the gate 150 is not in the blocking configuration the action slider may be retracted either by pushing the touch bar 104 or by driving the motor rod 130 to the retracted position. In the latter case the coupling couples retraction of the motor rod 130 to retraction of the action slider 108. The retraction of the action slider 108 manually or by the motor rod retracts the one or more bolts of the bolting module.

Figures 5A, 5B, 5C:
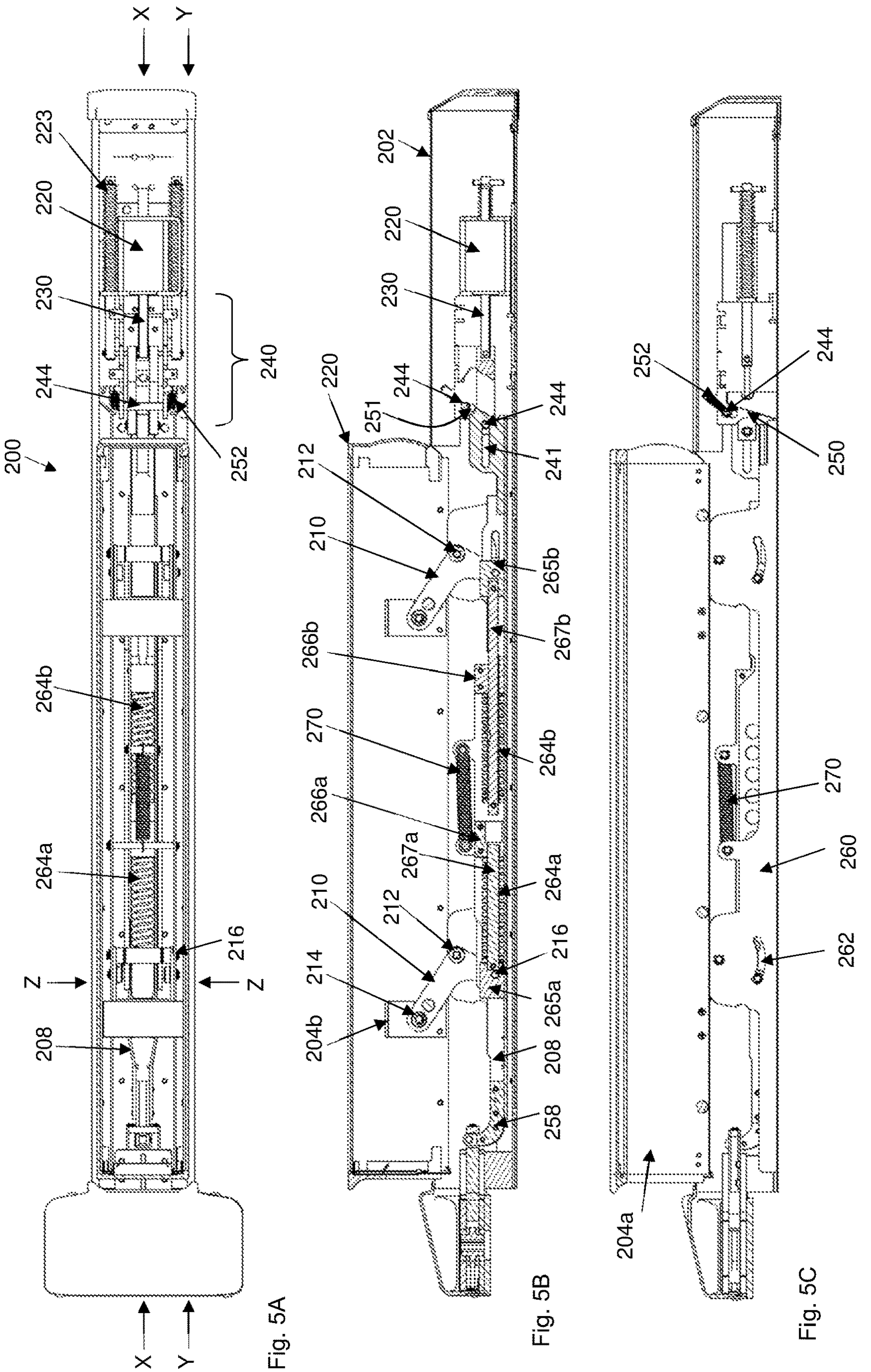
FIG. 5A is a plan view of the touch bar assembly.
FIGS. 5B and 5C are side cross-sectional views of the touch bar assembly respectively taken at a centreline and close to the outer lateral housing.

FIGS. 5A-5C show an embodiment of the touch bar assembly 200 according to the present invention. FIG. 5A is a plan view of the touch bar assembly with part of the touch bar 204 and part of the base cover 202 removed such that the mechanism inside can be seen. FIG. 5B is a side view taken as a cross-sectional view at the longitudinal centre line (line X-X) of the touch bar assembly. FIG. 5C is a side view taken as a cross-sectional view along line Y-Y such that the outer lateral housing is not shown. In FIGS. 5A-5C the touch bar is in the thrown or extended position ready to be depressed or pushed such as for emergency egress from a building.

FIG. 5B shows the touch bar 204 of the touch bar assembly. The touch bar 204 comprises an elongate panel or bar that extends along a substantial part of the touch bar assembly 200, such as at least half of the length of the touch bar assembly. Base housing 202 covers some parts of the internal mechanism of the touch bar assembly, such as motor 220. The touch bar 204, when in the thrown position as shown in FIGS. 5A-5C, extends from, that is it sits proud of the base housing 202. The touch bar may be configured as a solid unit, or to save weight may have a hollow part with side faces to shield internal mechanisms. The side faces are shown as 204*a* in FIG. 5C. The touch bar 204 is coupled to cranks 210. The cranks 210 may be L-shaped or may be bellcranks. Multiple cranks may be provided. For example, in FIG. 5B one is shown towards a first end of the touch bar and the other towards a second, opposing end of the touch bar. As shown in FIG. 5A, four cranks are provided. To support the touch bar across its width two cranks are provided adjacent to each other at each of the longitudinal positions towards the ends of the touch bar. For example, the third and fourth cranks are hidden behind the two cranks shown in FIG. 5B. The cranks are mounted to a base 260 of the assembly by respective pivots 212. Each adjacent pair of cranks are coupled to the touch bar 204 by a U-shaped support 204*b*. The support 204*b* spans the width of the touch bar to provide support to its width and is coupled to the side faces of the touch bar by fixings such as screws. The ends of the U-shaped supports 204*b* include pivots 214 at which the first ends of the cranks are mounted. The base 260 comprises a portion, such as a back plate, for mounting the touch bar assembly to a door. The parts of the base 260 at which the cranks are pivotably mounted are tabs extending transversely away form the back plate to raise the pivot 212 above the back plate such that the crank has space to rotate without the second end colliding with the back plate.

The touch bar assembly 200 further comprises an action slider 208 which may extend along a length of the touch bar assembly similarly to the length of the touch bar. Towards the left hand of FIGS. 5A-C the action slider 208 can be seen and includes a hooked portion 258 which extends upward, away from the back plate 260 to couple to a component for driving the bolts of the bolting mechanism, as described at FIG. 13. The action slider is coupled to the cranks 210 at pivots 216. As can be seen in FIG. 5C the coupling at pivot 216 may include a fastener. Since the fastener may protrude from the face of the crank and action slider, a slot 262 may be cut in the tab part of the base to accommodate the fastener. As can be seen in FIG. 5C the slot 262 is curved. This is because the rotational movement of the cranks will cause the action slider 208 to move translationally in a slight arc or rocking motion. The hooked portion 258 at the end of the action slider may fit into a hole in the component for connecting to the bolting mechanism. This hook and hole combination accommodates the small rocking motion that accompanies the lateral translation. If a cross-section is taken through the action slider 208 such as at Z-Z in FIG. 5A, the action slider may have a U-shaped cross-section which forms a channel along the slider 208. In this channel may optionally be formed a safety mechanism. The safety mechanism may allow depression of the touch bar even if movement of the action slider is blocked. However, in embodiments the safety mechanism may not be included and in such cases movement of the touch bar is coupled to movement of the action slider.

FIGS. 5A-5C show the safety mechanism which comprises a pair of stiff coiled safety springs 264*a*, 264*b*. Although the springs are coiled and two such springs are provided, other types and numbers of springs may be used instead. With the safety mechanism included, the cranks 210 couple via the safety springs to the action slider 208. In FIGS. 5A and 5B the left hand crank is pivotably coupled at 216 to first spring block 265*a*. First spring block 265*a* is coupled to the left hand stiff spring 264*a*. The other end of left hand stiff spring 264*a* is coupled to first fixing block 266*a* which is fixed in the channel of the action slider 208. The stiff springs 264*a*, 264*b* are compression springs. The direction of movement of the first spring block 265*a* as the stiff spring 264*a* is compressed may be guided by a rod 267*a* along the axis of the spring 264. The rod 267*a* may pass through a hole in first fixing block 266*a*.

The arrangement of the right hand cranks in FIGS. 5A-5C is similar to the left hand ones but with second stiff spring 264*b*. The arrangement of the second spring 264*b* differs from that of the first spring 264*a*. Here right hand cranks couple to second spring block 265*b* which is coupled to a rod 267*b* and rod 267*b* passes through a hole in second fixing block 266*b* which is fixed in position in the channel of the action slider. Second spring 264*b* is coupled between the end of rod 267*b* and second fixing block 266*b*. Rod 267*b* is configured through and along the axis of second spring 264*b*. When the touch bar is pressed but movement of the action slider is blocked the cranks rotate compressing the safety springs 264*a* and 264*b*. As shown in the figures the safety springs may be located in the channel of the action slider 208. We will describe operation of the safety springs in relation to FIG. 6.

Also shown in FIGS. 5A-5C is return spring 270. Return spring 270 acts to return the touch bar 204 to its thrown or start position when user pressure is released. The return spring acts between the touch bar and base 260. One end of return spring 270 is coupled to a rod which sits between a pair of opposing tabs extending from the sides of the base 260. The other end of the return spring is coupled to a rod which sits between a pair of opposing tabs extending from the sides of the action slider 208. The return spring 270 may be a coiled compression spring although other types of spring may be used. When the touch bar is depressed and the action slider moves, the return spring becomes extended. In FIGS. 5A-5C this is because the action slider 208 moves to the right. When the touch bar is released the return spring 270 pulls the action slider back to the start position and the cranks move the touch bar back to the thrown position.

Figures 6A, 6B, 6C, 6D:
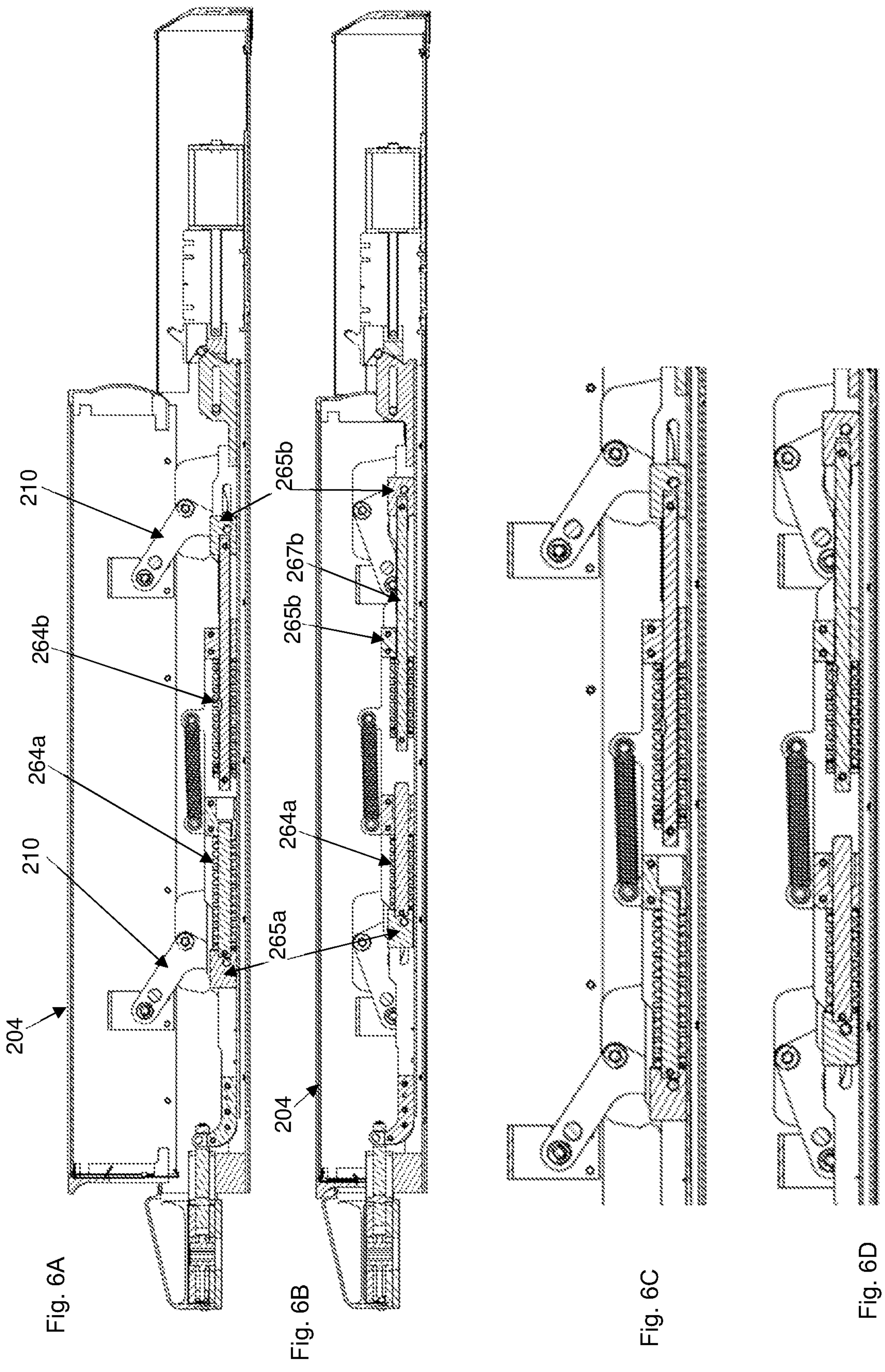
FIGS. 6A and 6B are side cross-sectional views of the touch bar assembly taken at a centreline, respectively showing the touch bar in the thrown and depressed positions with a blocking action causing compression of safety springs.
FIGS. 6C and 6D are enlarged views of portions of FIGS. 6A and 6B.

We now describe operation of the safety springs 264*a*, 264*b*. FIG. 6A is a cross-section view of the touch bar assembly 200 similar to FIG. 5B showing the touch bar in the thrown position. FIG. 6B shows a corresponding view but with the touch bar in the pressed or retracted position. In FIGS. 6A-6B the movement of the action slider is blocked so pushing on the touch bar causes the safety springs to compress as we will now describe. FIGS. 6C and 6D respectively also show the touch bar in the thrown and retracted positions but in partial enlarged views. As can be seen in FIGS. 6A and 6C the cranks 210 are each in their start positions with one end of the cranks pointing diagonally upwards to the left. In FIGS. 6A and 6C the safety springs 264 and 264*b* are shown extended. Turning to FIG. 6*b*, the touch bar 204 is depressed and the cranks 210 have rotated such that the ends of the cranks are now pointing downwards in the figure. The rotation of left hand crank has caused the first spring block 265*a* to move compressing left hand spring 264*a*. Rod 267*a* can be seen to have been forced further through hole in fixing block 266*a*. Similarly, the right hand spring 264*b* has been compressed by movement of spring block 265*b* to the right by rotation of right hand crank. The spring block 265*b* has pulled on rod 267*b* compressing the spring against fixing block 265*b*. On release of the touch bar 208 the safety springs return the cranks and touch bar to their thrown positions.

The portion of the action slider between the cranks and the safety springs, such as including spring blocks 265*a*, 265*b*, may be considered to be a receiving portion receiving the user force, and the portion of the action slider between the safety springs and the coupling 240, such as the fixing blocks 266*a*, 266*b*, may be considered to be a transmitting portion transmitting movement from the motor rod.

The action of the safety springs is to prevent damage to the touch bar assembly when movement of the action slider is blocked. We will describe this blocking further later in the description. When blocked and the touch bar has significant force applied to it, such as up to 1000N or more, the safety springs compress absorbing this force. Such forces may occur when the touch bar is under attack or being pressed by multiple people such as a crowd.

Figure 7A:
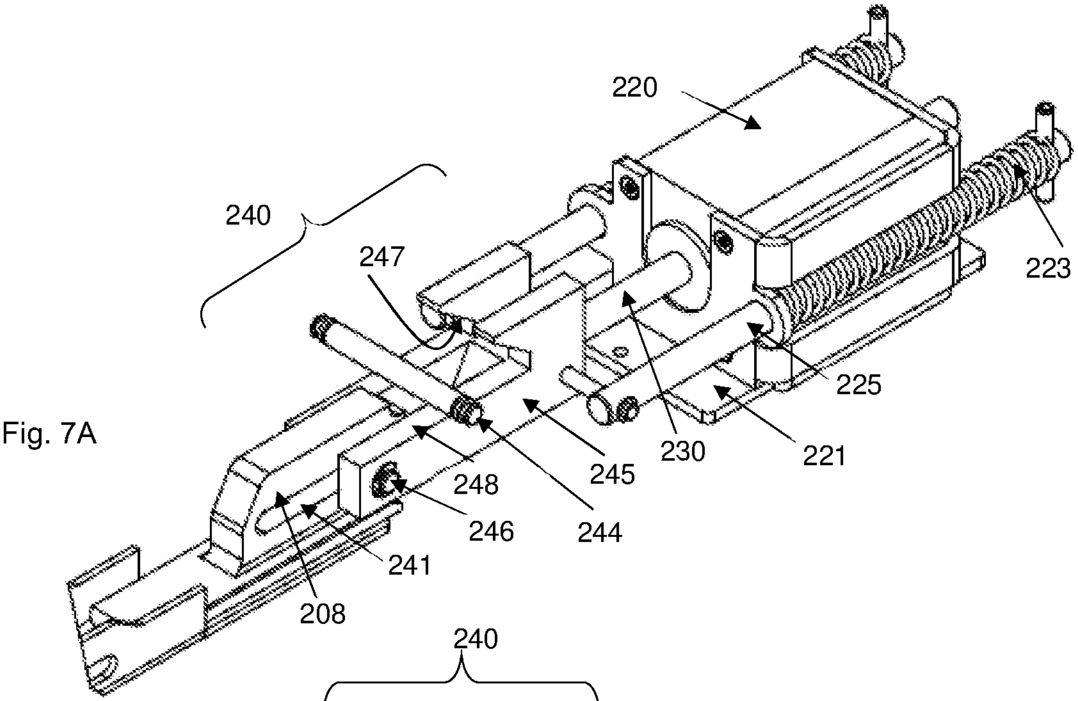
FIGS. 7A-7D respectively are a perspective view, plan view, side view and side cross-sectional view of the components controlling the blocking and retraction functions of the touch bar assembly.
Figure 7B:
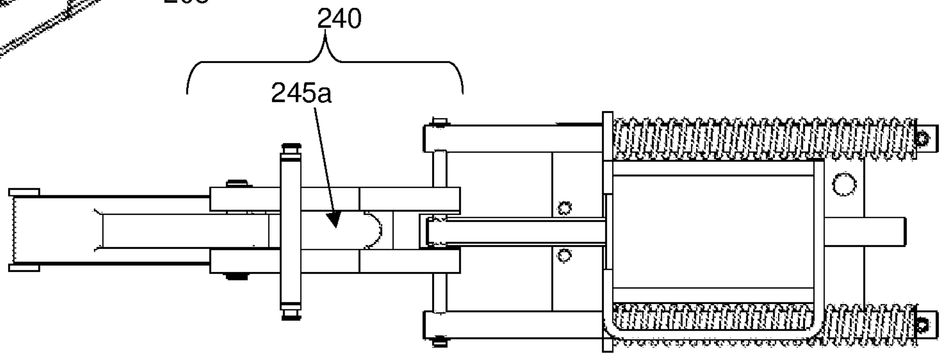

Returning to FIGS. 5A-5C we now describe the components shown towards the right hand of the figure which include a motor 220, motor rod 230 and coupling 240 comprising a gate. These components perform functions of blocking movement of the action slider 208, releasing the action slider for retraction, and providing motorised movement of the action slider such as to retract the bolt. FIGS. 7A-7D show in more detail these components. FIG. 7A is a perspective view and FIGS. 7B-7D respectively are a top plan view, a side view and a cross-sectional view taken along the longitudinal centreline of the components shown in FIG. 7B.

Motor 220 is located at one end of the touch bar assembly and is shown at the right hand side of FIGS. 5A-5C. Motor 220 may be a stepper motor that drives motor rod 230. Motor rod passes through the motor. The motor rod may be a threaded rod such as may be driven by a stepper motor. The motor may be a stepper motor that spins a core having a thread matching that of the rod. The core may be like a nut and the motor acts by spinning the core which moves the rod laterally in the appropriate direction. Other different types of motor and stepper motor may alternatively be used. For example, the motor may be a conventional motor that rotates a threaded shaft. A component with a threaded hole and the shaft extending through the hole will be driven laterally as the shaft turns. The component would be coupled similarly to the rod.

The motor 220 is fixed to base 260 of touch bar assembly 200 by bracket or mounting 221. Motor rod 230 couples to action slider 208 by coupling 240 which comprises a gate. Various configurations of coupling and gate may be possible. We describe herein preferred embodiments of the coupling and gate. The opposite end of action slider 208 to the hooked portion 258 is seen in FIGS. 7A-7D comprising a slot which we shall denote as slider slot 241. The slider slot 241 extends in a direction parallel to the longitudinal direction of the action slider 208. Between action slider 208 and motor rod 230 is carriage 245. The carriage 245 is coupled to the end of motor rod 230 to be driven backwards and forwards by motor rod 230. Carriage 245 includes a channel 245*a* which receives the end of the action slider 208 and in which the action slider can move laterally. The end of the channel 245*a* may be shaped to match the shape of the end of the action bar so that the two can move close together. The carriage 245 is coupled to the action slider 208 by carriage rod 246 which is located in slider slot 241. The carriage rod 246 is fixedly coupled to the carriage but is arranged to slide in the slider slot such that the carriage is coupled to the action slider but movement of the action slider relative to the carriage is permitted in a lost motion manner. The other end of the carriage is coupled to the motor rod 230. Motor springs 223 provide a bias to the carriage 245 to pull the carriage towards the motor 220. The motor springs 223 are coiled compression springs, although other types of spring may alternatively be used. Two motor springs 223 are provided, one each side of the motor 220. The bracket or mounting 221, or alternatively the motor housing itself, may comprise holed tabs or rings through which bias rods 225 pass. Each motor spring 223 may be provided with a bias rod

225 passing through it and coupled to a first end of the motor spring. The second end of the motor springs 223 abut against the holed tabs or rings through which the bias rods pass. The bias rods are also coupled to carriage 245 at an opposing end to the action slider 208. The coupling of the bias rods 225 to the carriage may be by a fastening such as the same fastening that the motor rod 230 is coupled to the carriage 245. This motor rod-to-carriage coupling may be a pin or bar that passes through the ends of the motor rod, bias rods and one end of the carriage. The motor rod-to-carriage coupling may allow the carriage to pivot with respect to the motor rod and bias rods. This allows for the small amount of rocking movement as the action slider 208 moves. The combination of motor springs 223 and bias rods 225 act to pull the carriage towards the motor.

Figure 7C:
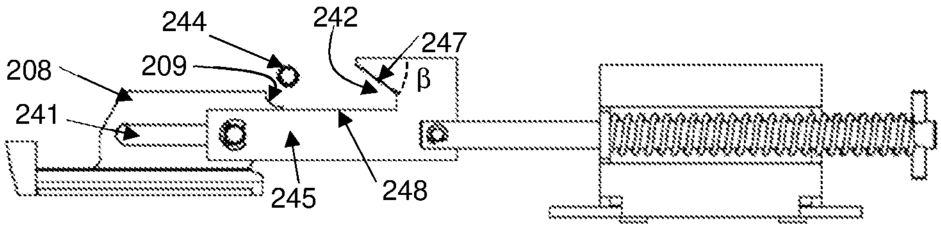
Figure 7D:
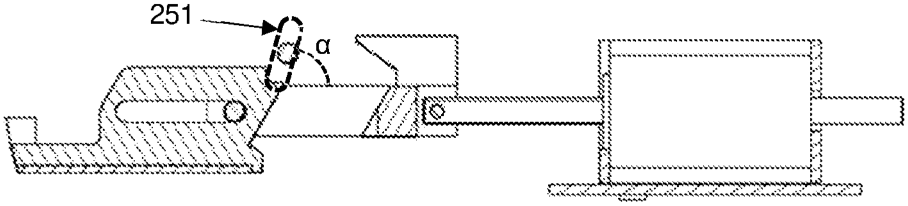

As can be seen in FIGS. 7A-7D the carriage includes a ramp comprising a sloping surface 247 or a pair of sloping surfaces, which as we will describe below are driving surface(s). As mentioned above, the carriage may comprise a channel in which the action slider 208 moves. Either side of this channel are guiding surfaces 248 which towards one end face the ramp driving surfaces such that the ramp driving surfaces and guiding surfaces together form a mouth 242 into which a stopping bar 244 may be received. Stopping bar 244 is shown in FIGS. 5A-5C and FIGS. 7A-7D. However, the mounting of the stopping bar is not shown in FIGS. 7A-7C. Coupled to base 260 is a mount 250 comprising walls extending from the base and either side of the carriage 245. The mount comprises slots 251 in the walls into which the stopping bar 244 extends. The slots 251 are angled extending away from the base 260 and slightly towards the motor. FIG. 7D shows the positioning of slot 251. As can be seen in FIG. 7D the slot is at angle α, which is preferably between 60° and 80° to the longitudinal direction of the touch bar assembly. More preferably, the angle is between 70° and 80°, such as at 75°. The stopping bar 244 is biased to moved up the slot away from the carriage 245 and action slider 208. The bias is provided by springs 252 which can be seen in FIGS. 5A and 5C. Springs 252 may be coiled springs that are tension springs. The springs may couple to the ends of stopping bar and to the walls of mount 250. The walls may have an extension tab to which the spring is coupled. The springs may pull in a direction similar, although not necessarily the same as the direction of the slot. However, a component of the spring pull direction should be sufficient to pull the stopping bar 244 along slot 251.

The mouth 242 on carriage formed by guiding surfaces 248 and sloping ramp surfaces 247 is arranged to collect stopping bar and move it downwards against the action of the springs 252. We will describe below how this action relates to various different states of the touch bar assembly. However, here will describe how the movement of the carriage moves the stopping bar. As discussed above, carriage 245 is driven by motor rod 230. In FIGS. 7C and 7D the stopping bar 244 is shown as above the action slider 208 and carriage such that the action slider can move towards the motor passing under the stopping bar (in the orientation shown in FIGS. 7C and 7D). The carriage 245 may driven away from the motor by movement of the motor rod 230. This brings mouth 242 closer to stopping bar. As the carriage approaches the stopping bar 244 the sloping ramp surfaces 247 push against the stopping bar. The direction of movement of the stopping bar is limited in that it can only move along slot 251. The sloping ramp surfaces 247 are sloped such that as the carriage is pushed further by the motor rod the sloping ramp surfaces pull the stopping bar downwards along the slot 251 towards the action slider 208. This movement is against the action of springs 252. As can be seen in FIGS. 7C and 7D the end of action slider 208 includes at its top a curved recess 209. As the stopping bar is pushed further downward by mouth 242 of carriage, the stopping bar is pushed into the recess 209 at the end of the action slider. In this position the stopping bar performs a blocking action against movement of the action slider, because it effectively blocks the path of movement of the action slider. We will describe the blocking action in more detail later in the description.

The sloping ramp surfaces 247 slope downwards at angle β below the horizontal to form the mouth 242. The angle is preferably between 25° and 45, and more preferably between 30° and 40° such as around 35°. The angle of the sloping surface is set such that it is easy to drive the stopping bar downwards as the carriage is moved towards the action slider and away from the motor. The angle of the slot 251 in which the stopping bar 244 moves is angle α which, as we have discussed above, may be 75°. It can be seen that the angle of the slot crosses the angle of the sloping surface. The angle of the slot 251 is set such that a high force is required in the longitudinal direction of the action slider to push the stopping bar back towards the motor. This is because viewed from the longitudinal direction of the action slider the angle of the slot is steep so only a small part of the applied force actually moves the stopping bar. Conversely, in the upwards direction such as away from the base 260 a smaller force may be required to push the stopping bar upwards. This is because the angle of the slot means that most of the upwards force is used to move the stopping bar. As described above, a preferred angle for a is 75°. If it is required that to make it easier to push the stopping bar along the slot using a horizontal force then the angle of the slot 251 should be adjusted at manufacture to closer to 45°. However, if it is required to make it harder to push the stopping bar along the slot using a horizontal force then the angle of the slot should be adjusted steeper and closer to 90°.

We have described various components of FIG. 7. The coupling is identified by reference number 240 and may be considered to comprises the carriage 245, stopping bar 245 and slot 251, along with fasteners or fixings to couple the carriage to the action slider 208 and motor rod. The coupling comprises the gate. The gate may be considered to be the stopping bar 244 which moves in slot 251. Other shapes and variations of components for the coupling an gate may be provided.

With reference to FIGS. 8 to 11 we now describe operation of the touch bar assembly. FIGS. 8A and 8B show sectional views of the touch bar assembly taken along the centreline in the same way as FIG. 5B. FIGS. 8C and 8D are similar to FIG. 7D showing sectional views of the components, including the gate and coupling, that perform functions of blocking movement of the action slider 208, releasing the action slider for retraction, and providing motorised movement of the action slider such as to retract the bolt. FIGS. 8A and 8C show the touch bar assembly and components in a neutral position or mid-position similar to FIG. 3C, with the touch bar and action slider thrown but ready for retraction. FIGS. 8B and 8D shown the touch bar assembly and components in a blocking position similar to FIG. 3B. In relation to FIG. 3 we described a gate that moves to block movement of the actions slider.

Figures 8A, 8B, 8C, 8D:
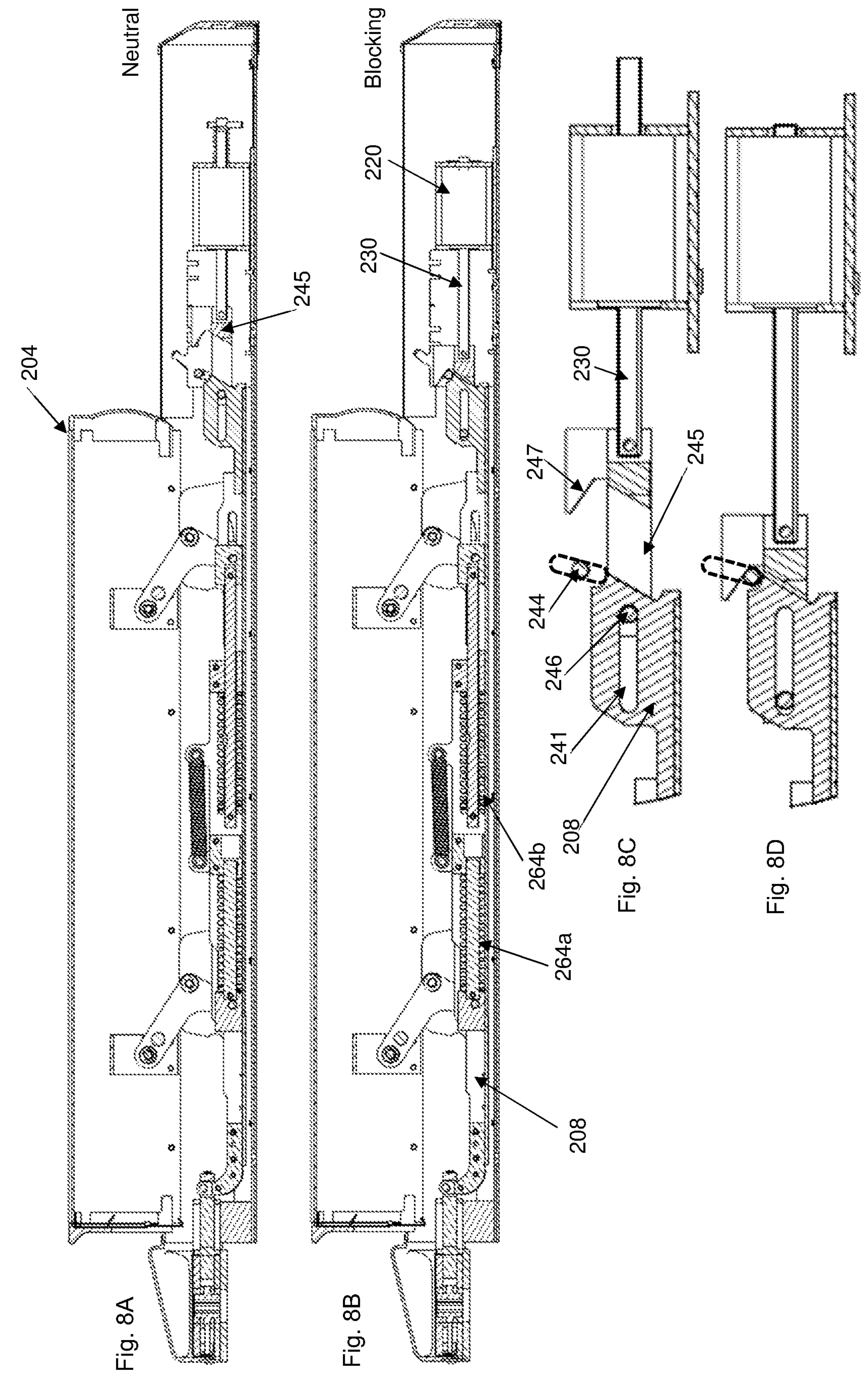
FIGS. 8A and 8B are side cross-sectional views of the touch bar assembly taken at a centreline, showing the touch bar in the thrown position and respectively showing the motor rod and other components in the neutral position and the blocking configuration.
FIGS. 8C and 8D are enlarged views of portions of FIGS. 8A and 8B.

FIGS. 8A and 8B show the touch bar 204 in the thrown position and the action slider also in the thrown position. To move to the blocking configuration, motor 220 drives motor rod 230 towards the action slider 208. The carriage 245 is coupled to the motor rod and also driven forwards towards the action slider 208. In FIGS. 8B and 8D it can be seen that the carriage 245 and motor rod are moved to the left in comparison to FIGS. 8A and 8C. Carriage 245 is coupled to action slider 208 by carriage rod 246 which moves in slider slot 241 in action slider. Between the neutral position shown in FIGS. 8A and 8C and the blocking position shown in FIGS. 8B and 8D the slider slot guides the movement of the carriage rod 246 and carriage 245. As described earlier, as the carriage 245 moves towards the action slider the ramp surfaces 247 of the mouth 242 push against the stopping bar 244. The movement of the stopping bar is constrained in slot 251 such that as the mouth pushes further against the stopping bar the stopping bar is pulled downwards towards the action bar. As can be seen in FIG. 8D the stopping bar is now located in the recess 209 at the end of the action slider 208. With the stopping bar in this position the action slider cannot be moved by pressing the touch bar because the stopping bar in the recess is in the path of movement of the action slider 208. The mouth 242 of the carriage holds the stopping bar in position. Here the stopping bar is in a blocking configuration. Hence, the gate may be considered to be closed. The motor 220 has a brake which holds the motor rod at the blocking configuration position shown. Since the motor is a stepper motor the brake may be part of the motor. Alternatively, the brake may be added separately, such as if a conventional motor is used. As mentioned above, the motor rod may be a threaded rod which is driven by the motor. The brake may engage the threads of the motor rod to stop movement of the motor rod, or the brake may act on moving parts in the motor to stop movement. The brake provides a force that prevents driving back of the stopping bar 244 when a force is applied to the touch bar. However, the braking force that the brake is able to apply is limited and it is desirable that the touch bar assembly can withstand a greater level of force than this limited amount before retraction of the bolts occurs. The stopping bar 244 in slot 251 is provided at an angle to increase the force that may be applied to the touch bar without the action slider and bolts retracting. As mentioned above, pushing the stopping bar out of the way is difficult when the force is applied by a user on the touch bar to push the action slider. As the force on the touch bar is increased the stopping bar does not move and the safety springs 264*a*, 264*b* are compressed as discussed in relation to FIGS. 6A-6C. With the safety springs fully compressed or close to full compression, the touch bar is also fully depressed and can be pushed no further. The touch bar will bottom out with parts of it hitting the base. Since the touch bar can be pressed no further, egress is limited until the motor is powered back or power is removed from the motor.

Release of the blocking action is the reverse of applying the blocking action. If the release is with the motor powered, the motor moves motor rod against the bias of motor springs 223. If the release is due to a loss of power, then the motor springs themselves pull the motor rod to release the blocking configuration. The unpowered action may not move the motor rod to the same position as the powered action but it will be sufficient to release the blocking action. User force can then move the motor rod a sufficient amount to permit retraction of the bolts.

Figures 9A, 9B, 9C, 9D:
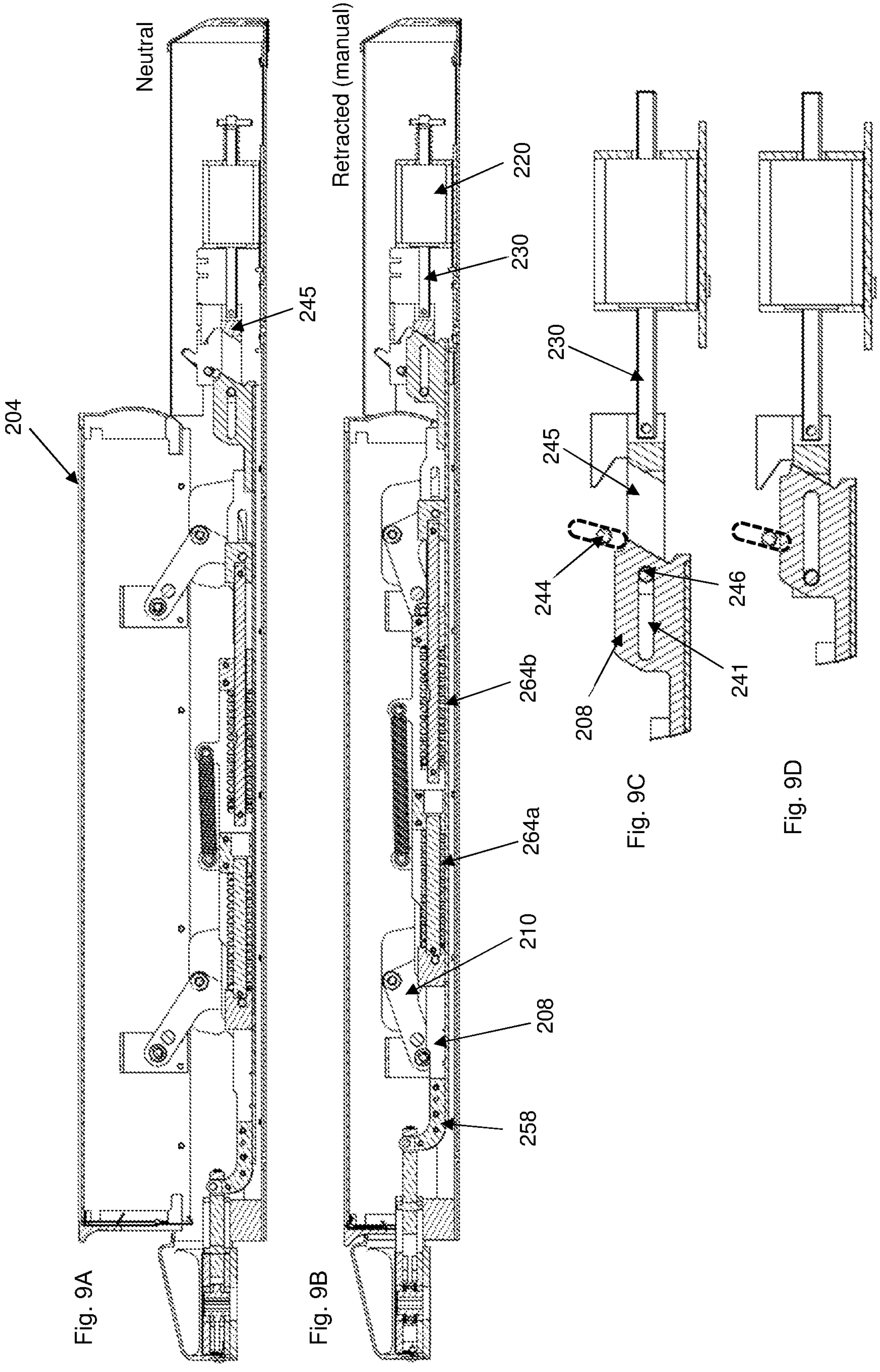
FIGS. 9A and 9B are side cross-sectional views of the touch bar assembly taken at a centreline, respectively showing the touch bar in the thrown and retracted positions, with the touch bar having been retracted manually.
FIGS. 9C and 9D are enlarged views of portions of FIGS. 9A and 9B.

We now describe manual retraction of the action slider and bolts with reference to FIGS. 9A-9D. FIGS. 9A and 9B show sectional views of the touch bar assembly taken along the centreline in the same way as FIG. 5B. FIGS. 9C and 9D are similar to FIG. 7D showing sectional views of the components that perform functions of blocking movement of the action slider 208, releasing the action slider for retraction, and providing motorised movement of the action slider such as to retract the bolt. FIGS. 9A and 9C show the touch bar assembly and components in the neutral position or mid-position similar to FIGS. 3C, 8A, and 8C, with the touch bar and action slider thrown but ready for retraction. FIGS. 9B and 9D shown the touch bar and action slider in the retracted position similar to FIG. 3D.

In FIG. 9A the motor rod 230 is shown in the neutral position or mid-position. In this position the stopping bar 244 is clear of the path of the action slider 208 and the action slider is able to move to retract the bolts of the bolting mechanism. The action slider may be moved manually by depressing the touch bar 204 or electrically by driving the motor 220. FIGS. 9A-9D relate to manual retraction of the bolts which we now describe. Motorised retraction is described in FIGS. 10A-10D. FIG. 9B shows touch bar 204 has been retracted by a user force pushing against the touch bar to depress the touch bar. Depressing of the touch bar 204 causes cranks 210 to rotate. This is shown in FIGS. 9A to 9B as an anticlockwise rotation. The cranks 210 push the action slider 208 towards the motor (towards the right hand direction in FIG. 9*b*). In FIG. 9B the retraction of the action slider 208 can be seen by the hooked portion 258 of the action slider 208 near the bolting mechanism is retracted. The hooked portion 258 has acted to retract the component of the bolting mechanism that releases the bolts. As the movement of the action slider is not blocked the safety springs 264*a*, 264*b* move with the action slider without compressing, as shown in FIG. 9B. Between the neutral and retracted positions of the action slider shown in FIGS. 9A-9D the motor rod 230 has not moved because the retraction has occurred manually. Hence, the carriage 245 is also in the same position in FIGS. 9A-9D. The end of the action slider 208 closest to the motor that includes the slider slot 241 and recess 209 has moved to the retracted position, as shown in FIGS. 9B and 9D. Carriage rod 246 also remains in the same position between FIGS. 9*c* and 9*d* but the slider slot 241 of action slider 208 has moved along relative to the carriage rod 246. This may be considered to be lost motion between the carriage 245 and action slider 208. The manual retraction of the action slider is permitted by this lost motion such that without moving or powering the motor the action slider is able to move manually.

Figures 10A, 10B, 10C, 10D:
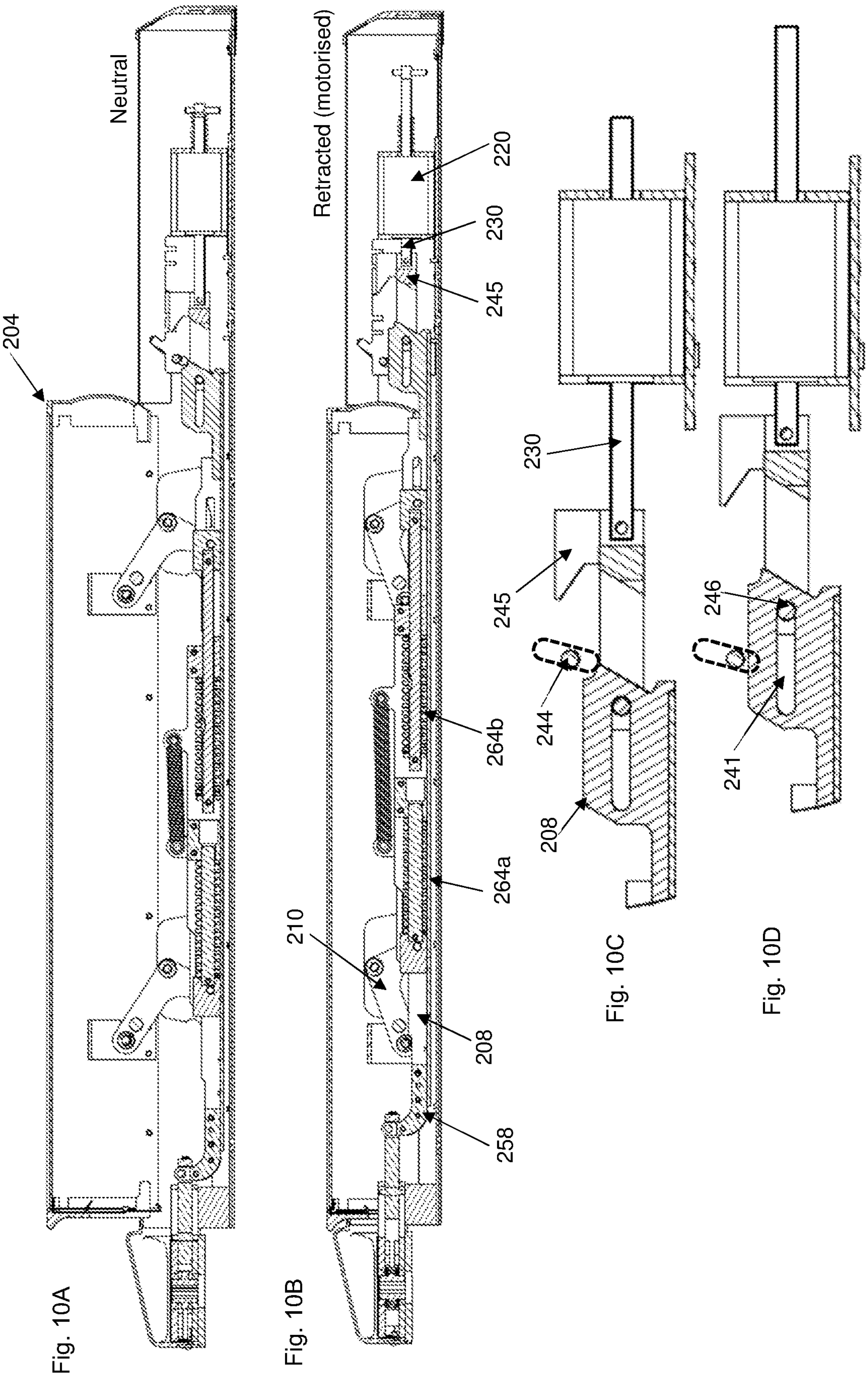
FIGS. 10A and 10B are side cross-sectional views of the touch bar assembly taken at a centreline, respectively showing the touch bar in the thrown and retracted positions, with the touch bar having been retracted by the motor.
FIGS. 10C and 10D are enlarged views of portions of FIGS. 10A and 10B.

Turning now to FIGS. 10A-10D we describe motorised retraction of the action slider and bolts of the bolting mechanism. FIGS. 10A and 10B show sectional views of the touch bar assembly taken along the centreline in the same way as FIG. 5B. FIGS. 10C and 10D are similar to FIG. 7D showing sectional views of the components that perform functions of blocking movement of the action slider 208, releasing the action slider for retraction and providing motorised movement of the action slider such as to retract the bolt. FIGS. 10A and 10C show the touch bar assembly and components in the neutral position or mid-position similar to FIGS. 3C, 8A, 8C, 9A, and 9C, with the touch bar and action slider thrown but ready for retraction. FIGS. 10B and 10D shown the touch bar and action slider in the retracted position similar to FIG. 3D. Different to FIGS. 9A-9D the retraction shown in FIGS. 10B and 10D has occurred by motorised movement of the action slider.

As shown in FIG. 10A the motor rod is in the neutral or mid-position. In this position the stopping bar 244 is clear of the path of the action slider and the action slider is able to move to retract the bolts of the bolting mechanism. As shown in FIG. 10B the motor 220 has retracted motor rod 230 pulling the carriage 245 towards the motor. For example, it can be seen in FIG. 10B in comparison to FIG. 10A that a shorter length of motor rod extends out of the left side of the motor and a longer length out of the right side of the motor. Carriage 245 can also be seen to be closer to motor 220. In FIGS. 10A and 10C the motor rod 230 is in the neutral position and carriage rod 246 is at the end of slider slot 241 of action slider 208. As the motor retracts the motor rod 230 the carriage rod 246 pulls on the end of slider slot 241 pulling the action slider 208 towards the motor. In FIGS. 10B and 10D the carriage has been moved towards the motor and the action slider is also moved towards the motor. As for FIGS. 9A and 9B, the safety springs 264*a*, 264*b*, move with the action slider, as do the cranks. The safety springs are not compressed. The cranks rotate down as if pushed by the touch bar such that the touch bar is moved as if it has been depressed. That is, the touch bar is moved to the retracted position by the motor driving of retraction. As can be seen in FIG. 10B, the hooked portion 258 of action slider has moved to pull on the component connecting to the bolting mechanism so as to retract the bolts.

By enabling the touch bar assembly to have motorised movement of the action slider and retraction of the bolts, the touch bar assembly can be used with access control systems. Such access control systems may operate to retract and throw bolts electrically. For example, a user wishing to exit or enter through a locked door can present an access card against a reader or enter a PIN number into a PIN pad. If the card is authorised or the PIN number is correct the access control system authorizes entry or exit and sends an electrical signal to the touch bar assembly to retract the bolt using the motor.

As mentioned, delayed egress is enabled by having the touch bar assembly configured to release and optionally retract the bolts electrically. We will now describe the function and operation of delayed egress. Delayed egress allows the touch bar to release bolts after a short delay following attempted pushing of the touch bar by a user. The delay may be 5, 10, 20 or 30 seconds, for example. The delay is usually used as a security feature. For example, as discussed in the background section usually a person wishing to exit in an emergency wishes to escape from the building because of a fire in the building. However, a person stealing goods may use an emergency exit to escape a building because it may provide a rapid way to exit and/or by exiting through the emergency exit the person may avoid security at the main entrance or exit doors. The delayed egress provides a short delay to the release of the bolts and emergency exit doors which may provide sufficient time for a person stealing goods to be noticed and stopped. The delayed egress is usually of a short duration in case there is an emergency such as a fire in the building. Furthermore, if a fire is identified the delayed egress function may be removed and/or the motorised release may be used to release the bolts secured by the touch bar.

A touch bar providing delayed egress will include a sensor to identify when the touch bar is pushed. For example, by referring to FIG. 6 a sensor may be located at a position along the length of the touch bar to monitor any depressing movement. The sensor may be a microswitch or reed switch (Hall effect switch). Alternatively, a sensor or switch may be located at a position along the length of the action slider to monitor movement there. In delayed egress mode the motor rod would be in the blocking position to prevent movement of the action slider and retraction of the bolts. The touch bar is configured to allow a small amount of movement when pressed. This is achieved by a small gap, such as around 2 mm, between the edge of the curved recess 209 (see FIG. 7C) in the action slider and the position of the stopping bar 244. The gap allows enough movement for the action slider to be pushed slightly to activate a monitoring switch. The gap also allows the stopping bar to lift or fall unhindered by the recess when needed. A sensor will detect the small amount of movement, such as the 2 mm, and start a timer for the required delay. Once the delay has expired a signal is supplied to the motor 220 to move the motor rod 230 from the blocking position to the retracted position. A controller may be connected between the sensor and motor to receive a signal from the sensor, commence a timer and operate the motor after the time has expired. Delayed egress comprises moving the motor rod and action slider from a blocking position such as in FIGS. 8B and 8D, to the neutral position such as in FIGS. 8A, 8C, 10A, and 10C, and further to the retracted position such as shown in FIGS. 10B and 10D, by action of the motor. Alternatively, delayed egress may comprise moving the motor rod and action slider from a blocking position such as in FIGS. 8B and 8D, to the neutral position such as in FIGS. 8A, 8C, 9A, and 9C, where upon manual pressure on the touch bar moves the action slider to the released position shown in FIGS. 9B and 9D.

Figure 11A:
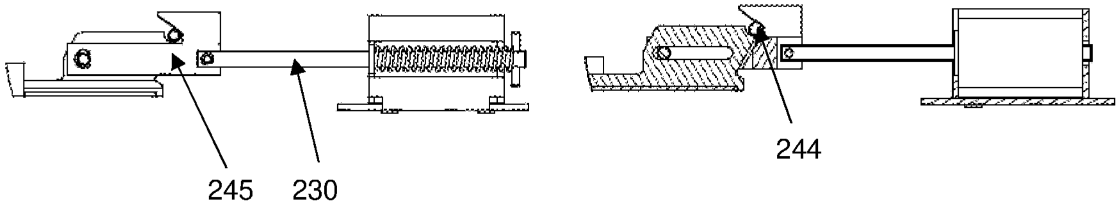
FIGS. 11A-11C show components controlling the blocking and retraction functions during steps of egress, from blocking to retracted positions, when power to the motor is removed or lost, in side view and cross-sectional view.
Figure 11B:
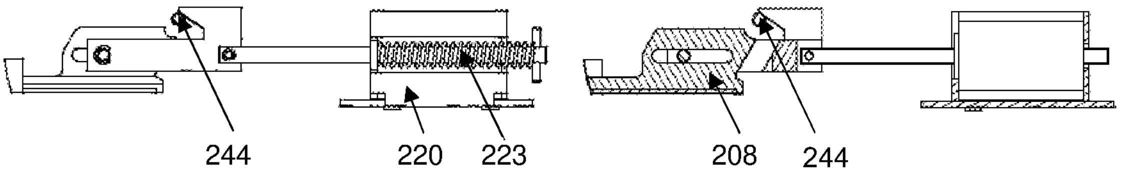
Figure 11C:
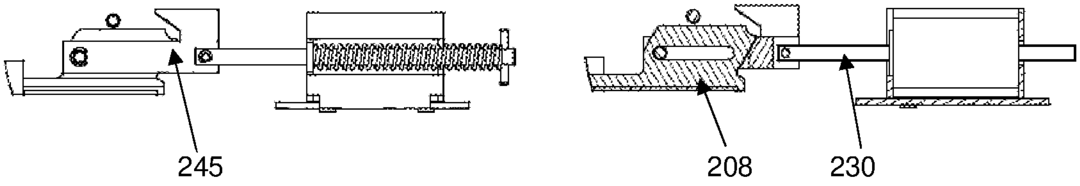

We have described how delayed egress operates normally when the touch bar assembly is powered. FIGS. 11A-11C show steps of egress when there is a power failure or when power is turned off, for example, during a fire. Each of FIGS. 11A-11C includes two images. The left hand image in each of FIGS. 11A-11C is similar to FIG. 5C which is a side view of the motor and other components, and is included to show the position of motor springs 223. The right hand image in each of FIGS. 11A-11C is similar to FIG. 5D which is a cross-section taken through the centreline of the motor, and is included to show the position of the carriage rod 246 in slider slot 241.

In FIG. 11A the carriage 245 is pushed fully forward by the motor rod such that the components are in the blocking configuration, including having the stopping bar in the recess at the end of action slider to block movement of the action slider. In FIG. 11B power has been removed such that the motor brake is disabled. The carriage 245 partially retracts towards the motor rod 230 under tension provided by motor springs 223. The partial retraction of the carriage 245 releases the stopping bar 244 and allows it to move out of the path of the action slider 208 under the bias of springs 252. FIG. 11C shows that the action slider 208 and motor rod 230 have been moved to retracted positions. This is by manual action of the touch bar 204 by pushing by a user. The carriage 245 is also moved back. In this position the action slider 208 is retracted to retract the bolts and release the door for egress.

FIGS. 12A-12D shows steps of egress in a special case when pressure or a load is continuously applied to the touch bar 104. Each of FIGS. 12A-12D includes two images. The left hand images in each of FIGS. 12A-12D are similar to the left hand figures in FIGS. 11A-11C showing side views of the motor and other components, and are included to show the position of motor springs 223. The right hand images in each of FIGS. 12A-12D are similar to the right hand figures in FIGS. 11A-11C which are cross-sections taken through the centreline of the motor, and are included to show the position of the carriage rod 246 in slider slot 241.

In FIG. 12A the motor rod 230 is in the blocking position with mouth of the carriage holding the stopping bar in the blocking position blocking movement of the action slider. Force is applied to the touch bar pushing the action slider up against the stopping bar 244 such that the surfaces of the recess at the end of the action slider push against the stopping bar. In FIG. 12B power is no longer supplied to the motor which, similar to FIG. 11B, results in the motor brake being disabled and the carriage is partially retracted under the tension of motor springs 223. Differently to FIG. 11B, with the load continuing to be applied to the touch bar, the stopping bar 244 is held in position in the recess at the end of the action slider preventing movement of the action slider. In FIG. 12C the load is increased and the stopping bar is forced upwards in the slot 251 to clear the slider and allow retraction. In FIG. 12D the continued force or load provided by the user pushes the action slider further retracting the bolts. In FIG. 12D it can be seen that the manual retraction has pushed back the motor springs 223 and motor rod 230 such that the motor rod is at the neutral position. The lost motion, resulting from carriage rod 246 moving in slider slot 241, between the action slider 208 and carriage 245 allows the action slider to be at the retracted position. As can be seen the loss or removal of power in FIG. 12B causes the motor springs to pull the motor rod, carriage and action slider back towards the neutral position but further manual pushing is required to fully push the motor rod to the neutral position.

Figure 13A:
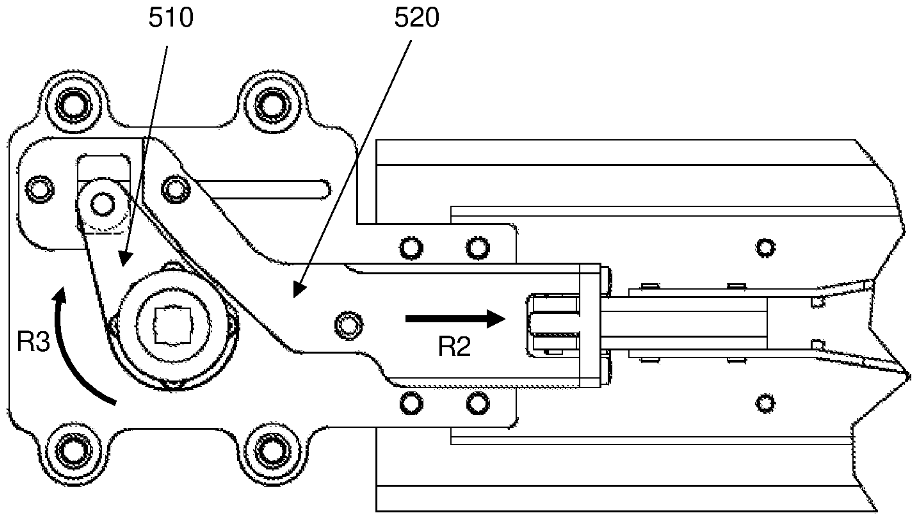
FIGS. 13A and 13B are side and top plan views of the interface between the touch bar and a bolting mechanism.
Figure 13B:
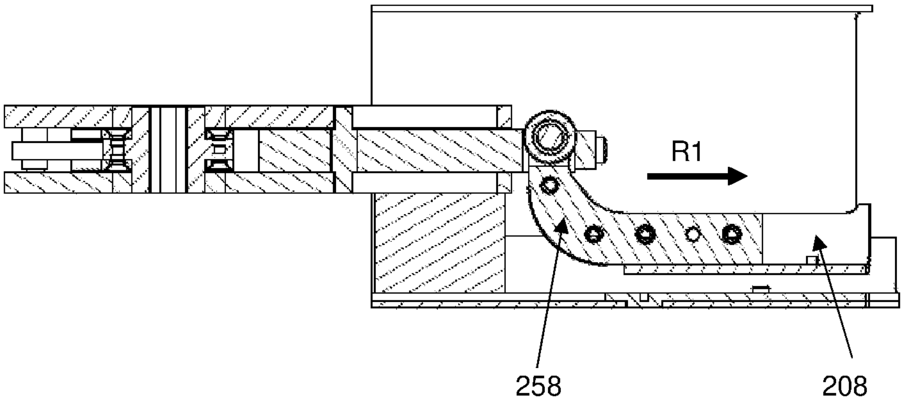

FIGS. 13A and 13B are side and top plan views of the interface between the touch bar and the bolting mechanism. As mentioned above, the action slider 208 may have a hooked portion 258 at the end proximal to the bolting mechanism. The bolting mechanism may comprise a slide arm 520 which couples to cam 510. The hooked portion couples into a hole in the slide arm 520. The slide arm is coupled at the other end to an off-centre part of cam 510. Retraction of the action slider 208, as shown by arrow R1 in FIG. 13B, pulls on the slide arm 520 as shown by arrow R2 in FIG. 13A. The lateral movement of the slide arm is coupled to rotation of the cam as shown by the arrow R3. The rotation is used to rotate gears or rotors, for example, in the bolting mechanism that engage with bolts and retract the bolts to allow a door to be opened. Other mechanisms for coupling between the touch bar and bolts are possible.

Figure 14:
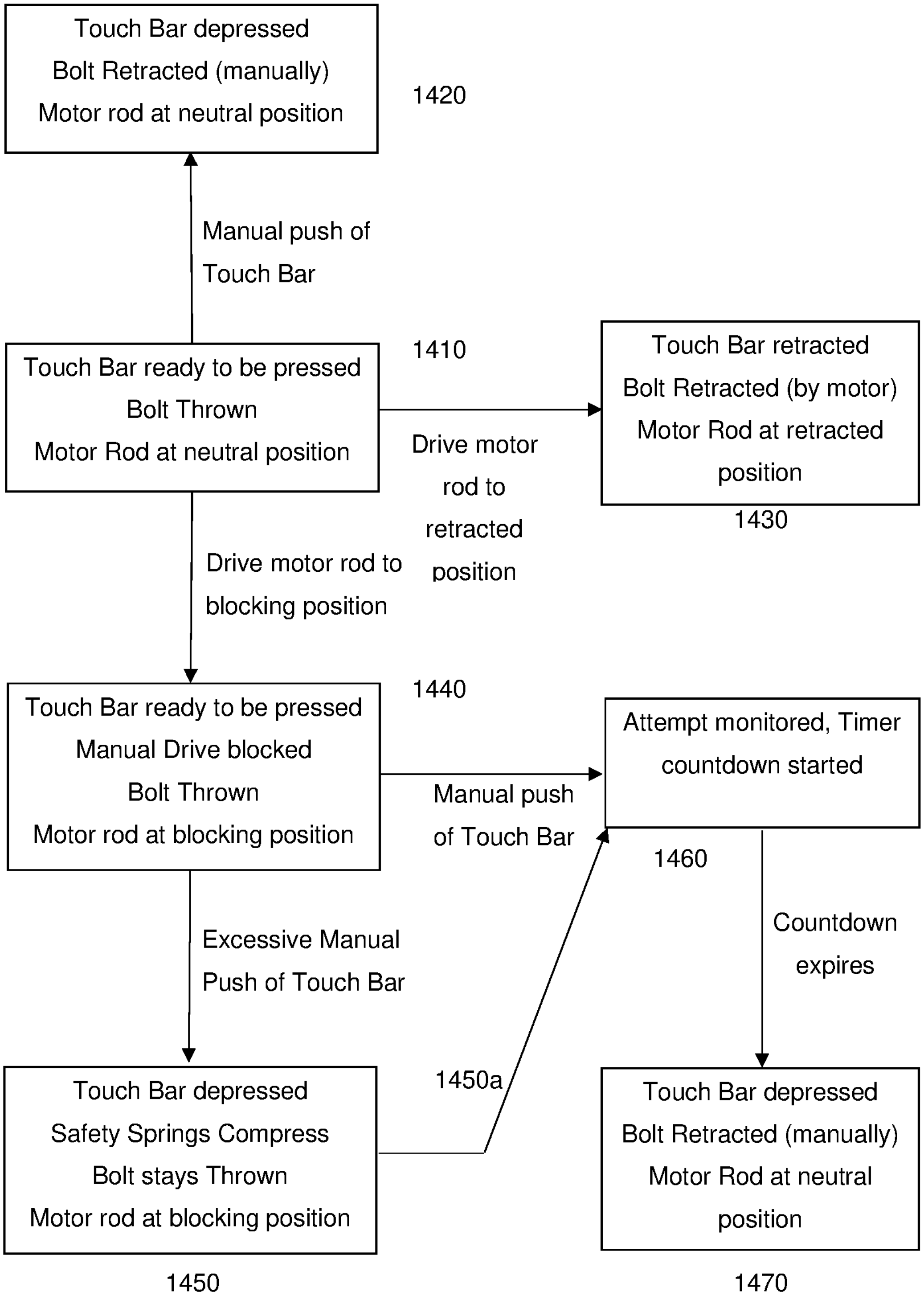
FIG. 14 is a flow diagram showing the different operation steps of the touch bar assembly.

FIG. 14 is a flow diagram showing the different operation steps of the touch bar assembly described herein. Block 1410 represents the neutral position in which the bolts are thrown to secure the door. The motor rod is at the neutral position and the touch bar is free to be depressed to retract the bolts. At block 1420 the touch bar has been manually depressed and the bolts are retracted. The motor rod is not moved and remains in the neutral position. Alternatively, as shown as block 1430 instead of retracting the bolts by the touch bar they can be retracted by operation of the motor to move the motor rod to the retracted position. Returning to the neutral position of the motor rod at block 1410, the motor rod may be driven to a blocking position as shown at block 1440. If strong or excessive manual force pushing the touch bar occurs then the safety springs compress moving to block 1450. At block 1450 the bolts stay thrown and the motor rod remains at the blocking position and egress is prevented. Returning to the motor rod at the blocking position at 1440, if a manual attempt at pushing the touch bar occurs, this may be detected and start a timer for delayed egress at 1360. When the countdown expires, the motor rod is moved to the neutral position and further pushing of the touch bar retracts the bolts at 1470. As indicated by arrow 1450*a*, the strong or excessive manual force at 1450 may also be monitored as an attempt to release the touch bar, such that this also starts the timer countdown at 1460 for delayed egress. Movement back through the blocks is achieved by reversing the steps shown.

Figure 15:
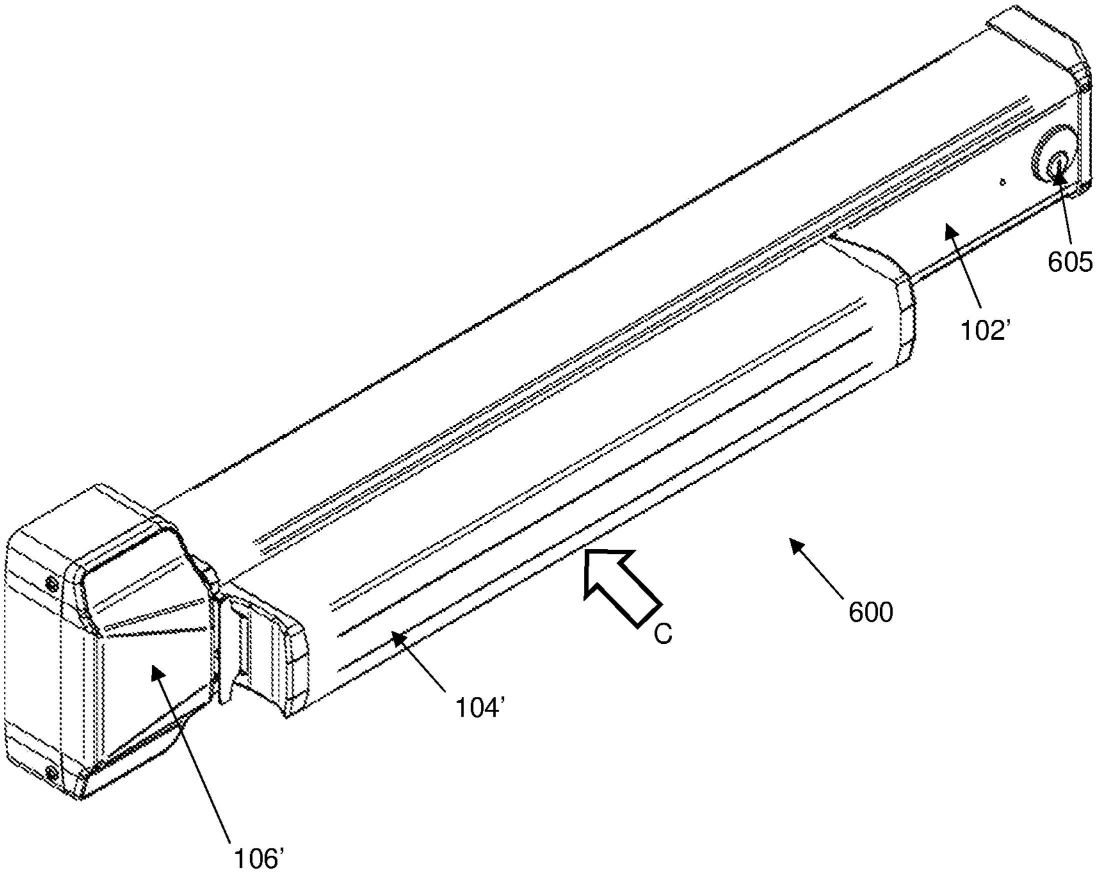
FIG. 15 is a perspective drawing of a touch bar assembly according to a second embodiment of the present invention.

FIG. 15 is a perspective view of a touch bar assembly 600 according to a second embodiment of the present invention. The touch bar assembly may be fitted to a door in a similar way to that shown in FIG. 1. Similarly to the touch bar assembly 100 of FIG. 2, the touch bar assembly 600 of FIG. 15 comprises a base housing 102' and a touch bar 104'. Various of the features of touch bar assembly 600 are the same or similar to the features of touch bar assembly 100, and where this is the case similar reference numbers are used, such as by adding a dash or apostrophe. However, there are also a number of differences between the touch bar assembly 600 and touch bar assembly 100. One difference is that the touch bar assembly 600 is shorter than that of touch bar assembly 100. Touch bar assembly 100 is described as extending across the width of a door. It is also desirable that the touch bar assembly is shorter than the width of a door, for example, the width of standard or common fire doors, such that it may fit on smaller doors or does not extend all the way across the fire door. Accordingly, the touch bar assembly 600 of FIG. 15 is shorter than that of FIG. 2. This can be seen by the reduced length of the base housing 102' in comparison to base housing 102 in FIG. 2. The touch bar 104' may be substantially the same length as touch bar 104 of FIG. 2.

The reduced length of the touch bar assembly 600 is achieved by changing the location of some functionality. As can be seen in FIG. 15, the connection cover 106' is deeper than the connection cover 106 in FIG. 2. Similarly to FIG. 2, the connection cover 106' covers the connection between the mechanism of the touch bar assembly and the bolting mechanism that is operated by the touch bar assembly 600. The bolting mechanism is not shown in FIGS. 2 and 15 but, for example, may be located behind the connection cover 106' or 106 and may drive one or more bolts in a corresponding manner to bolting mechanism 30 in FIG. 1. The connection cover 106' of FIG. 15 is deeper than that of FIG. 2 because the gate and blocking functions are relocated to this end of the touch bar assembly from the far end.

The touch bar assembly 600 may also include key cylinder 605 which we will discuss later.

Similarly to FIG. 2, actuation of the touch bar 104' of the assembly 600 is by pushing or depressing the touch bar in the direction shown by arrow C such that it is partly retracted into the base housing. Pushing or depression of the touch bar 104' acts to retract bolts such as the bolts 40 shown in FIG. 1.

The touch bar assembly 600 according to the second embodiment of the present invention may provide functions of manual retraction of one or more bolts and motorised retraction of one or more bolts. Delayed egress may also be included which may be motorised or manually operated. The touch bar assembly of the present invention includes a blocking action that blocks the touch bar from actuating the bolts. This blocking action remains until released by a motor or power to the motor is turned off. Delayed egress may be provided in a similar manner to the first embodiment by using sensors and controlling blocking FIGS. 16A-16D are schematic diagrams of the mechanism of the touch bar assembly 600. Many of the features shown in FIGS. 16A-16D are the same as those shown in FIGS. 3A-3D. Similarly to FIGS. 3A-3D, the touch bar assembly 600 can be seen to include base housing 102' and touch bar 104' for depressing by a user in a direction as indicated by arrow C. The touch bar assembly 600 further comprises action slider 608 which is coupled to the touch bar 104' by a pair of cranks 110'. The cranks may be L-shaped cranks, bellcranks or other suitable cranks or arms for providing the required linkage. The cranks are mounted in the housing to rotate about pivot 112'. The cranks are connected to the touch bar at pivots 114' towards one end of the L-shape. The cranks are connected at the other end to the action slider at pivots 116' which is at the other end of the L-shape. As will be noted from the figure the cranks and their arrangement is similar to the cranks shown in FIGS. 3A-3D.

Differently to FIGS. 3A-3D the action slider 608 may be formed of two portions, namely a receiving portion 608*r* and a transmitting portion 608*t*. The receiving portion 608 is configured to receive the driving action from the user action on the touch bar 104'. The transmitting portion is configured to transmit the driving action onwards to drive retraction of the bolt or bolts of the bolting mechanism. The receiving portion 608*r* and transmitting portion 608*t* are linked by a stiff spring which is known as safety spring 608*s*. The operation of the action slider will be described later in this document. In embodiments the action slider may not be formed of two portions but may instead be formed of a single portion without safety spring. We now briefly describe operation of the touch bar assuming the action slider is formed as a single portion without the safety spring. Operation of the touch bar 104' is similar to that described for touch bar 104 of FIGS. 3A-3D in that pushing of the touch bar in the direction of arrow C causes the cranks 114' to rotate in the direction of arrows D, resulting in retraction of action slider 608 in the direction of arrow E. As for the arrangement of FIGS. 3A-3D, by having the touch bar 104' coupled to the action slider 608 by cranks 110' with a pin based pivot as the touch bar is depressed the action slider may move through a slight arc. The crank and arc movement described herein experiences less friction for a smoother action as compared to conventional touch bars.

The push pad assembly may optionally further comprise a motor 120' for powered retraction of the push pad and bolts. In this arrangement, the action slider 608 is coupled to motor rod 130' which is moved by a motor 120'. The coupling between the action slider 608 and motor 120' is different to that of FIGS. 3A-3D. The motor rod 130' is coupled to the action slider 608 with a lost-motion coupling. Operation of the motor 120' and motor rod 130' is described with reference to FIGS. 16B-16D. The motor rod 130' is moved by motor 120' when controlled to do so and when power is applied to the motor. The motor 120' is arranged to drive the motor rod 130' from a thrown position to a retracted position. The motor 120' is also arranged to reverse the movement of the motor rod 130'. FIG. 16B shows the motor rod 130' in the thrown position corresponding to the bolt or bolts being thrown and the touch bar 104' being in the extended position. FIG. 16C shows the motor rod 130' in the retracted position corresponding to the bolt or bolts being retracted and the touch bar 104' being in the retracted or depressed position. To move from the positionings of FIG. 16B to those of FIG. 16C, the motor 120' has been driven to retract the motor rod 130' pulling the action slider 608 towards the motor 120' to the retracted position shown in FIG. 16C. The cranks 110' will also rotate, pulling on the touch bar 104' to move it to the depressed position. FIG. 16D shows the action slider 608 has moved in comparison to FIG. 16A but the motor rod 130' continues to be in the thrown or extended position. This is because the touch bar has been operated manually by a user depressing the touch bar, causing rotation of the cranks, and the action slider moving to the retracted position. Although the motor rod is maintained in the thrown or extended position, the lost-motion coupling between the motor rod and action slider does not prevent the action slider from being retracted.

Also shown schematically in FIG. 16A is an optional gate 650 arrangement of this second embodiment. Differently to the embodiment of FIGS. 3A-3D the gate 650 is separate from retraction motor 120 or 120'. The gate 650 is provided at the front of the touch bar assembly closest to the bolt or bolts of bolting mechanism, whereas the retraction motor is provided at the rear of the touch bar assembly. The action slider 608 couples to cam or gearbox 660 which couples the lateral movement of the action slider to rotational movement for rotational driving of the bolt mechanism. The rotational cam or gearbox may drive the bolting mechanism by rotation of a spindle 670. The gate may block movement of the action slider 608. When the gate is in the blocking position movement of the action slider either manually by depressing the touch bar 104' or by powering the retraction motor is blocked.

The safety spring 608*s* between the two portions of the action slider 608*t* and 608*r* allows depression of the touch bar 104' when movement of the action slider is blocked. The blocking of movement of the action slider may be by either the gate 650 as described above or by a deadlock in the bolting mechanism preventing movement of the bolts which thereby prevents rotation of the cam or gearbox and lateral movement of the action slider 680. Under user pressure at the touch bar 104' the cranks 110' will rotate in the usual way. However, transmitting portion 608*t* of the action slider will blocked from moving laterally. Receiving portion 608*r* of action slider will be driven laterally by rotation of the cranks 110'. This will extend safety spring 608*s*. Accordingly, safety spring will be able to absorb force of a user and prevent injury to the user and damage to the touch bar assembly when the touch bar is depressed but movement of the action slider is blocked.

Figure 17:
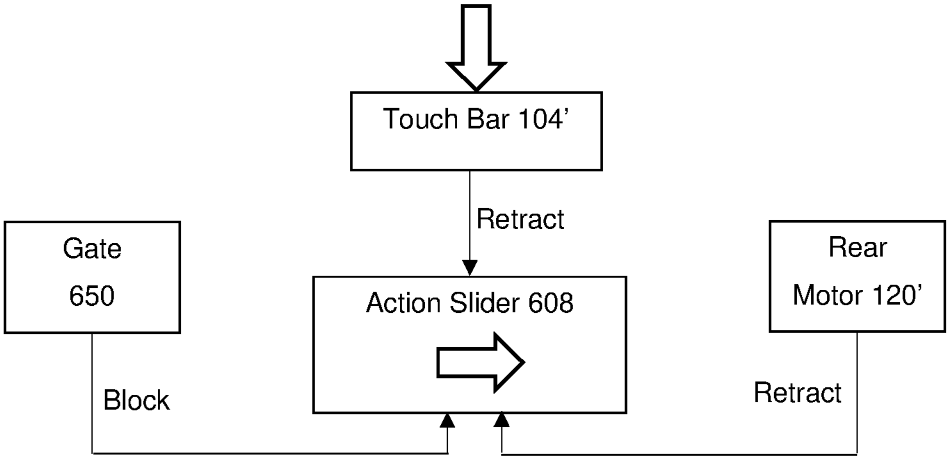
FIG. 17 is a block diagram showing the relation between components of the touch bar assembly of FIG. 16.

FIG. 17 is a flow chart summarizing the operation of the touch bar assembly 600 of FIG. 16. The movement of the action slider is controlled by the gate 650 which may block movement of the transmitting portion of the action slider. If the gate is not blocking retraction of the action slider, the touch bar 104' or the rear motor 120' are operable to retract the transmitting portion of the action slider.

Figure 18A:
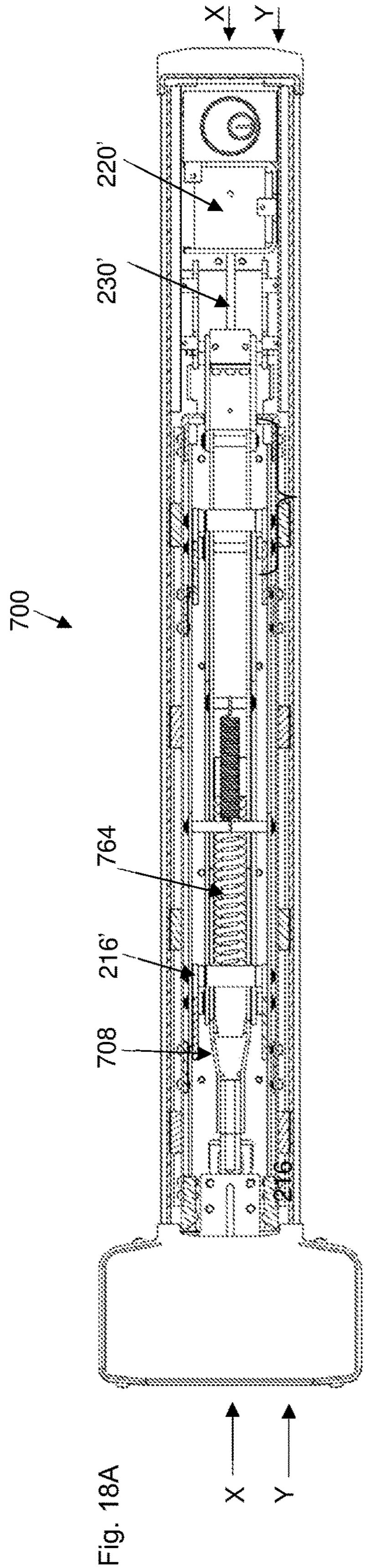
FIG. 18A is a plan view of a touch bar assembly according to a second embodiment and FIGS. 18B and 18C are side cross-sectional views of the touch bar assembly respectively taken at a centreline and close to the outer lateral housing.
Figure 18B:
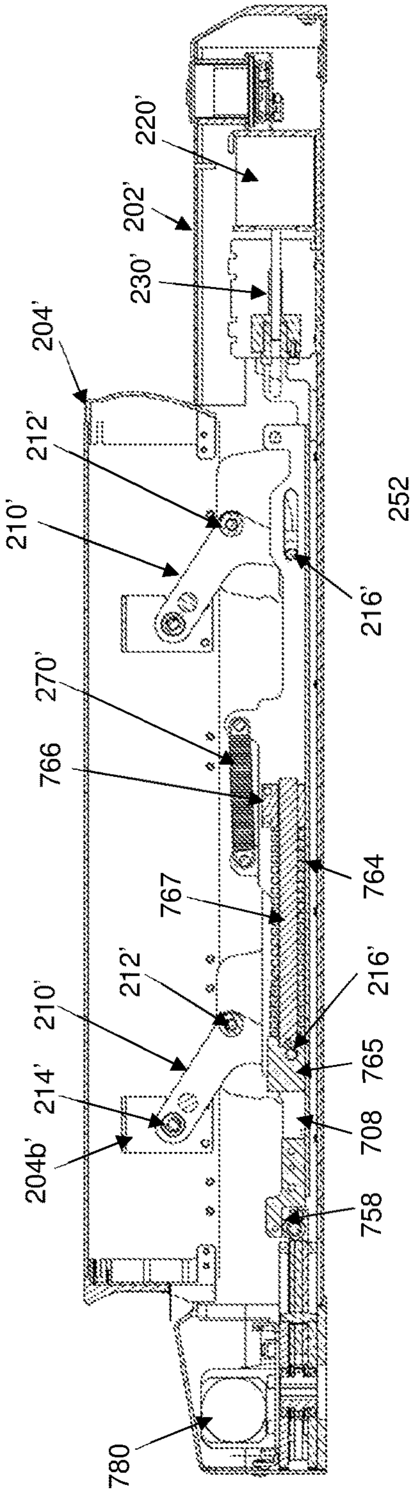
Figure 18C:
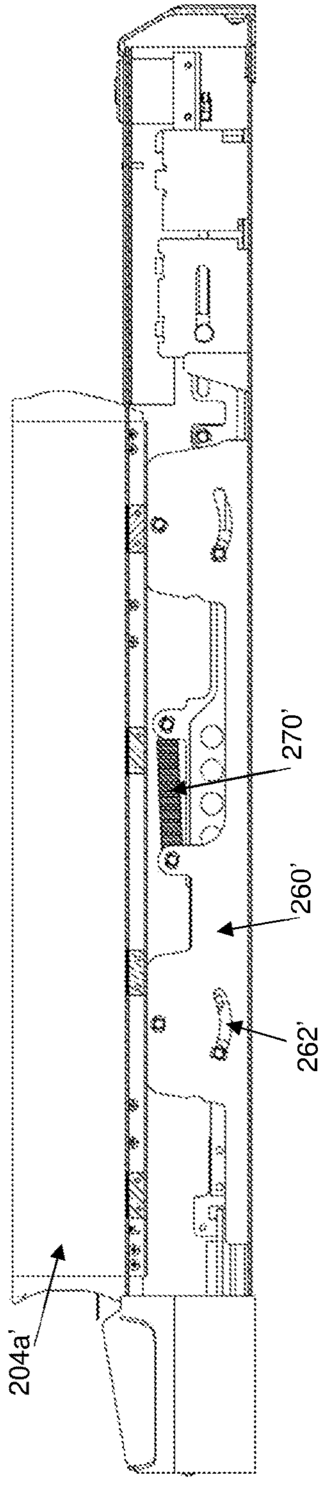

FIGS. 18A-18C show an embodiment of the touch bar assembly 700 according to the present invention. FIG. 18A is a plan view of the touch bar assembly with part of the touch bar 204' and part of the base cover 202' removed such that the mechanism inside can be seen. FIG. 18B is a side view taken as a cross-sectional view at the longitudinal centre line (line X-X) of the touch bar assembly. FIG. 18C is a side view taken as a cross-sectional view along line Y-Y such that the outer lateral housing is not shown. In FIGS. 18*a*-18*c* the touch bar is in the thrown or extended position ready to be depressed or pushed such as for emergency egress from a building.

The touch bar assembly 700 of FIGS. 18A-18C includes many similarities to the touch bar assembly of FIGS. 5A-5C. Like parts are indicated similar reference numbers. For example, like parts to those of FIGS. 5A-5C are indicated by reference numbers with an added dash or apostrophe. For example, cranks 210' are similar to cranks 210 of FIGS. 5A-5C and pivot about similar pivots 212'. Operation of parts of the touch bar assembly also includes many similarities to that of FIGS. 5A-5C.

The embodiment of FIGS. 18A-18C differs from that of FIGS. 5A-5C in three main aspects. Firstly, the embodiment comprises a single safety 764 instead of the pair of safety springs 26*a*, 264*b*, in the embodiment of FIGS. 5A-5C.

Secondly, the motor 120' is configured for retracting the action slider 708 but does not set a blocking or gating action as for the motor 120 of FIGS. 5*a*-5*c*. Thirdly, the gating or blocking action in the embodiment of FIGS. 18A-18C is provided by a second motor 780, separate from the retraction motor 120', and the second motor is provided at the opposite end of the touch bar assembly to the retraction motor. Each of these three differences will now be described.

Similar to previously described in relation to FIGS. 5A-5C, in FIGS. 18A-18C cranks 210' rotate about pivots 212' attached to housing or base 260' of the touch bar assembly. Cranks 212' are coupled to action slider 708 at pivots 216'. Action slider is formed of two portions. The safety spring 764 is coupled between the two portions of the action slider to form a safety mechanism. The safety spring 764 is a stiff spring similar to safety springs 264*a*, 264*b*, shown in FIGS. 5A-5C. However, by including only a single safety spring the length of the touch bar assembly can be reduced. Similar to safety springs 264*a*, 264*b*, the safety spring 764 may be a stiff coiled safety spring. Other types of spring may be used instead. With the safety mechanism included, the cranks 210' couple via the safety spring to the action slider 208. In FIGS. 18A and 18*b* the left hand crank is pivotably coupled at 216' to spring block 765. Spring block 765 is coupled to the safety spring 764. The other end of safety spring 764 is coupled to fixing block 766 which is fixed to the transmitting portion of the action slider. The safety spring 764 is a compression spring. The direction of movement of the spring block 765 as the stiff spring 764 is compressed may be guided by a rod 767 along the axis of the spring 764. The rod 767 may pass through a hole in the fixing block 766.

The receiving portion of the action slider 708 may be formed of a pair of parallel elongate plates, between which the transmitting portion and safety spring are located. The receiving portion rigidly couples the spring block 765 at the pivot of one of the pairs of cranks 210' to a similar block at the pivot 216' of the other pair of cranks 210' towards the other end on the touch bar. The receiving portion connects the two cranks such that pushing one end of the touch bar rotating cranks at that end of the touch bar causes the receiving portion to drive the other crank such that the touch bar moves evenly along its length. In other words, pushing of the touch bar at one end causes the other end of the touch bar to be moved by a corresponding amount maintaining the outer surface of the touch bar 204' substantially parallel to the base or housing of the assembly. The operation of the safety springs will be described further in relation to FIGS. 19 and 20.

Similarly to the embodiment of FIGS. 5A-5C the action slider 708 of FIGS. 18A-18C may extend along a length of the touch bar assembly similarly to the length of the touch bar. Towards the left hand of FIGS. 18A-18C the action slider 708 can be seen and includes a hooked portion 758. The hooked portion may differ from the hooked portion 258 of FIGS. 5A-5C. For example, the hooked portion 758 may extends upward, away from the back plate 260' and then back downward towards the backplate to couple to a component for driving the bolts of the bolting mechanism.

As described previously, slot 262' accommodates a fastener at the pivot 216'. The slot accommodates movement of the fastener as the actions slider is driven by the cranks, which results in in a slight arc or rocking motion. The hooked portion 258 at the end of the action slider may fit into a hole in the component for connecting to the bolting mechanism. This hook and hole combination accommodates the small rocking motion that accompanies the lateral translation.

Figure 19A:
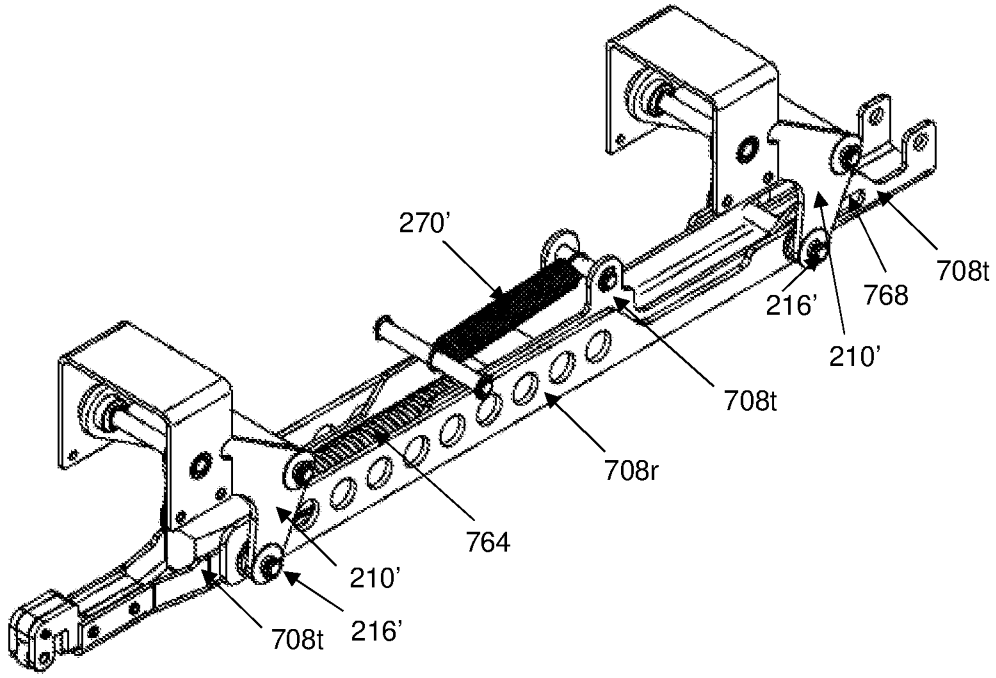
FIG. 19A is a perspective view of the safety spring and related features with the housing and base plate removed.
Figure 19B:
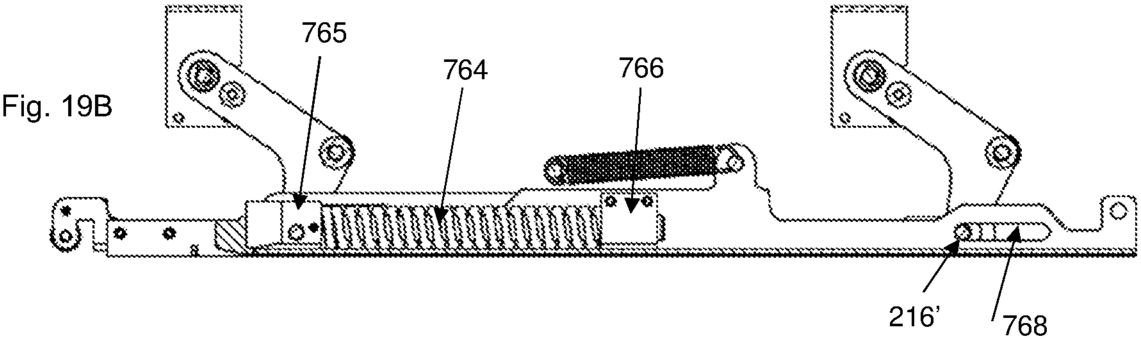
FIGS. 19B and 19C are side plan views of these features respectively in positions in which the touch bar is extended and the touch bar is depressed.
Figure 19C:
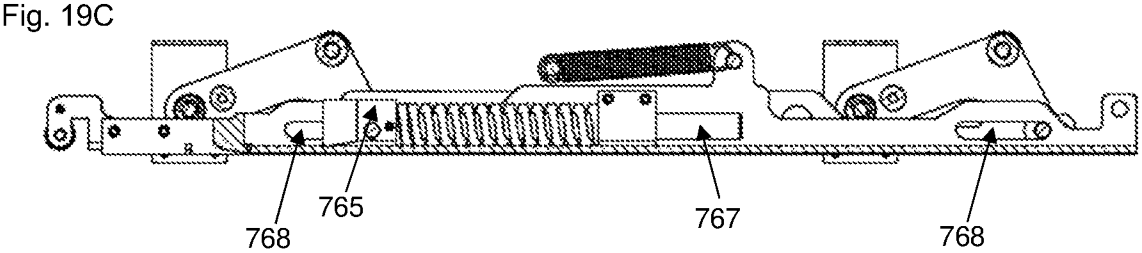

FIGS. 19A-19C show the arrangement of the safety spring 764, two portions of the action slider 708*r*, 708*t*, and the cranks 110'. FIG. 19A is a perspective view of these aspects with the housing and base plate removed. FIGS. 19B and 19C are side plan views of these aspects respectively in positions in which the touch bar is extended and the touch bar is depressed. Return spring 270' is also clearly shown in these figures. As shown in FIG. 19A, the cranks 210' couple to the receiving portion of the action slider 708*r* at pivots 216'. Also at the pivot 216' is spring block 765 which is coupled at the pivot 216'. The receiving portion 708*r* has a channel formed between parallel side plates or beams. The receiving portion may be formed as a pair of plates. As shown in the figure the side beams have a series of holes cut in them to reduce weight. Safety spring 762 can be seen, located in the channel of the transmitting portion 708*t*, and has a first end fixed to spring block 765 at pivot 216'. The transmitting portion 708*t* of the action slider extends lengthways beyond the receiving portion and in the embodiment shown rests along the channel, or between plates of, the receiving portion. The transmitting portion 708*t* also has parallel side beams and may be formed with a U-shaped cross-section. The transmitting portion 708*t* is located in the channel of the receiving portion and the safety spring 774 is located in the channel of the transmitting portion. A second end of safety spring 764 is fixed to fixing block 766 which is fixed to the transmitting portion of the action slider, such as around half way along the transmitting portion. Safety spring may be a coiled spring. From spring block 765 is coupled a rod 767 along the axis through the centre of the spring. The rod extends through a hole in fixing block 766. Transmitting portion 708*t* of the action slider is coupled to pivots 216' by slots 768 in the transmitting portion. For example, a pin or rod acts as the pivot between the crank 216' and receiving portion 708*r* of the action slider, and the pin or rod extends through the slot 768. Safety spring 764 is a stiff spring, much stiffer than return spring 270'. Return spring is coupled between housing and transmitting portion of action slider.

We now describe operation of the safety spring 764, although it is similar to operation of the pair of safety springs described in relation to FIGS. 5 and 6. FIG. 19A shows cranks 210' in their upright positions indicative of the touch bar 204' being in the thrown or extended position. In FIG. 19B it can be seen that the pivots are at one end the slot 768. In the figure the pins of the pivot are at the left hand end, that is, they are at the end of the slot nearest to the bolting mechanism (not shown in the figure). In FIG. 19B the safety spring 764 has been compressed. This is because the touch bar has been depressed as can be seen because the cranks have rotated. However, movement of the transmitting portion of the action slider is blocked. Hence, as the cranks 210' rotate the pivot 216' moves laterally (to the right in the figure) away from the bolt mechanism end of the action slider. Spring block 765 is also pushed in the same direction, but because transmitting portion of action slider is blocked from moving, the safety spring is compressed. The rod 767 through safety spring and fixing block is also moved and can be seen to extend further through the fixing block 766 in FIG. 19C than in FIG. 19B. The pins or rods at pivots 216' move along slots 768 to the other end of the slots. Whichever end of the touch bar is pushed, the receiving portion of the action slider, transmits motion to the crank at the other end of the touch bar to concomitantly move the other end of the touch bar 204'. Return of the touch bar to the thrown or extended position occurs by the force of the safety spring 764 on release of the touch bar by the user.

The action of the safety spring is to prevent damage to the touch bar assembly when movement of the action slider is blocked. When blocked and the touch bar has significant force applied to it, such as up to 1000N or more, the safety spring compress absorbing this force. Such forces may occur when the touch bar is under attack or being pressed by multiple people such as a crowd.

Figure 20A:
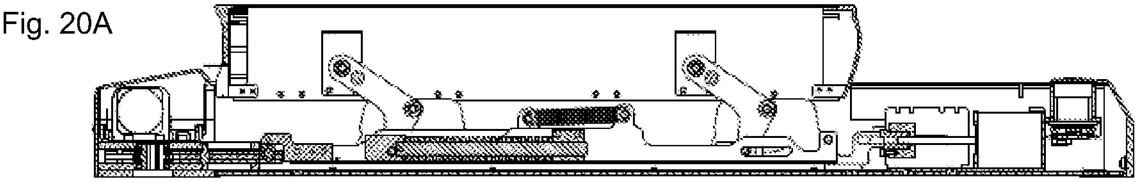
FIGS. 20A and 20B are side cross-sectional views of the touch bar assembly according to a second embodiment taken at a centreline, respectively showing the touch bar in the thrown and depressed positions with a blocking action causing compression of safety springs.
Figure 20B:
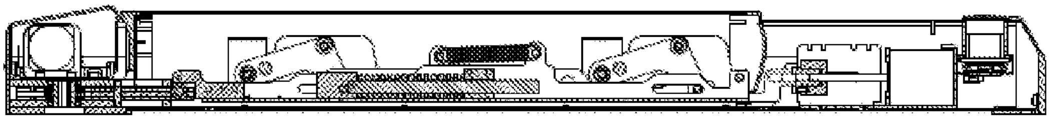
Figure 20C:
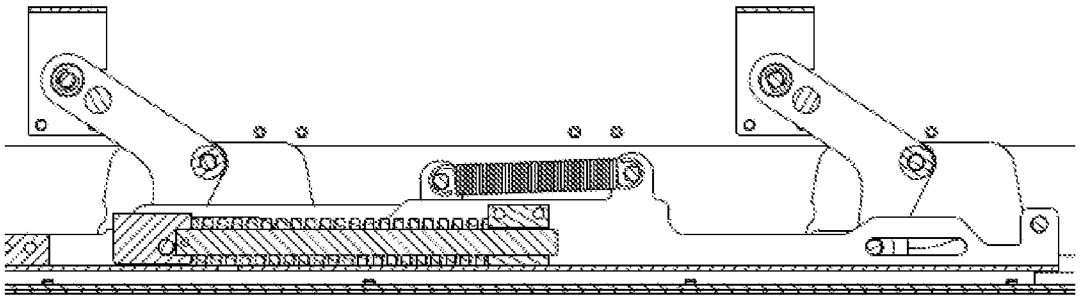
FIGS. 20C and 20D are enlarged views of portions of FIGS. 20A and 20B.
Figure 20D:
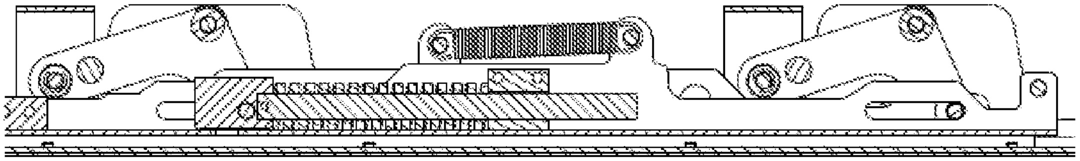

FIGS. 20A-20D show the same movement of the touch bar to compress the safety springs as in FIGS. 19A-19C. FIGS. 20A and 20B are respectively side views through the centre of the touch bar assembly for the touch bar in thrown (extended) and depressed positions, with movement of the action slider blocked. FIGS. 20C and 20D are enlarged views corresponding to FIGS. 20A and 20B respectively, to more clearly show the safety spring.

Figure 21A:
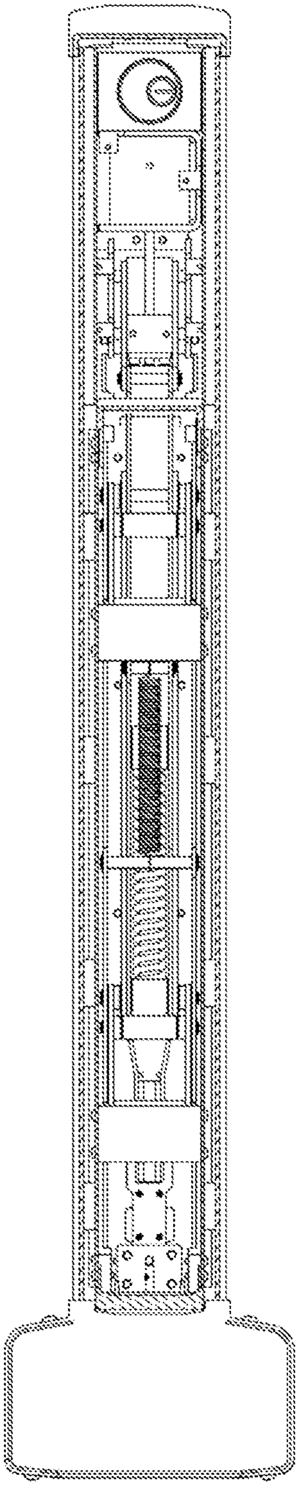
FIG. 21A is a plan view of the touch bar assembly of FIG. 18 and FIGS. 21B and 21C are side cross-sectional views of the touch bar assembly respectively taken at a centreline and close to the outer lateral housing showing how the action slider moves when the touch bar is depressed and movement of the action slider is not blocked.
Figure 21B:
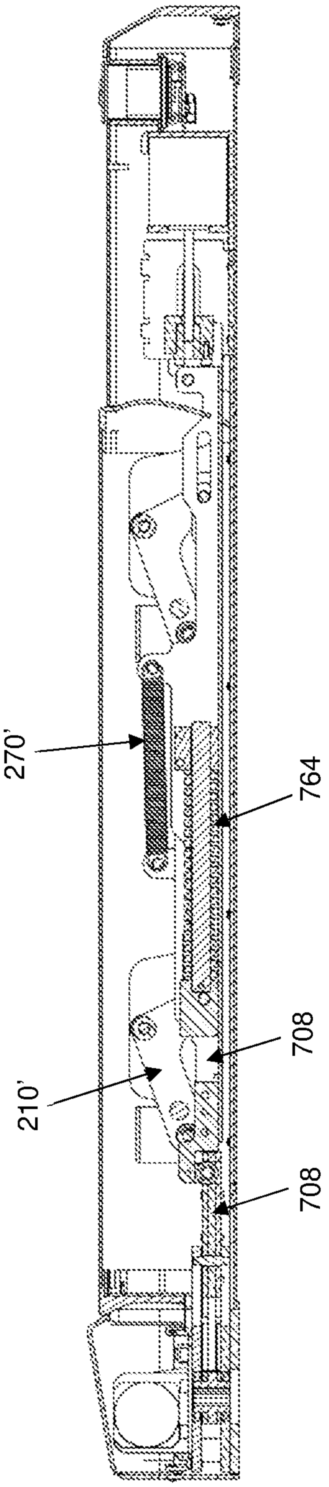
Figure 21C:
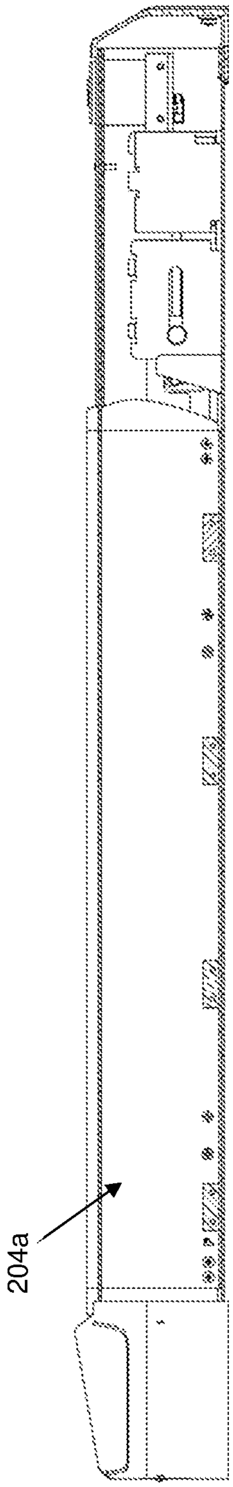

FIGS. 21-21C show how the action slider moves when the touch bar is depressed and movement of the action slider is not blocked. These figures are shown at a similar detail, scale and orientation/section view as FIGS. 18A-18C which shows the touch bar in the thrown or extended position. FIG. 21A is a top plan view of the touch bar assembly with the top face of the touch bar removed. FIG. 21B is a side sectional view at the centre of the touch bar assembly taken along the line X-X in FIG. 18. FIG. 21C is a side view of the touch bar assembly taken along the line Y-Y in FIG. 18. As can be seen in FIG. 21 the touch bar has been depressed rotating the cranks 210'. Differently to FIGS. 19 and 20, movement of the action slider is not blocked. Hence, the cranks 210' move both the transmitting portion and receiving portion of the action slider together. As can be seen, in comparison to FIG. 18 the action slider 708 has moved to the right, in a direction away from the bolting mechanism. The end of the action slider 708 closest to bolting mechanism is driven to rotate a cam and release the bolts. Safety spring 764 is not compressed. Return spring 270' is extended. On release of the touch bar, the touch bar and action slider will be returned to their starting positions shown in FIG. 18 by the bias of the return spring. As can be seen in FIG. 21C the side faces of touch bar move towards the base of the assembly such that in the sectional view much of the details are hidden.

The coupling of the end of the action slider 708 to drive bolting mechanism to release the bolts may use interface assembly 500 shown in FIGS. 13A and 13B. The action slider 708 may have a hooked portion 758 at the end proximal to the bolting mechanism. The interface assembly 500 may comprise a slide arm 520 which couples to cam 510. The hooked portion couples into a hole in the slide arm 520. The slide arm is coupled at the other end to cam 510 which may be an off-centre part of cam 510. Retraction of the action slider 208, as shown by arrow R1 in FIG. 13B, pulls on the slide arm 520 as shown by arrow R2 in FIG. 13A. The lateral movement of the slide arm is coupled to rotation of the cam as shown by the arrow R3. The rotation is used to rotate gears or rotors, for example, in the bolting mechanism that engage with bolts and retract the bolts to allow a door to be opened.

A suitable bolting mechanism may be the Slimline product by Surelock McGill Limited or those described in European Patent Application published as EP 4215699, United Kingdom Patents GB 2289084 and GB 2413822, U.S. Pat. No. 5,865,479, and US Patent Application published as US 2023/0235596, the contents of which are incorporated herein. For reference, the bolting mechanism may comprise gears which are driven such as by a spindle, and the one or more bolts have a toothed portion or rack meshing with the gears. When the gears are driven the meshing bolts are retracted. A toothed bias member may engage with one or more of the gears to throw the bolts. In examples, the bias may be a spring which may cause the bolts to be thrown with a strong force such as 40N. When a deadbolt is fitted to the bolting mechanism, this is configured to be activated from one side of the door, such as the outside for security, but should not hinder release in an emergency from the inside. The deadbolt engages in a notch in one of the bolts and may for example be driven by a key cylinder on the outside. An override is fitted that allows turning of the gears from the inside side of the door to override the deadbolt. As described in the patents listed, the override may be activated during initial turning of the gears from inside.

Figure 23A:
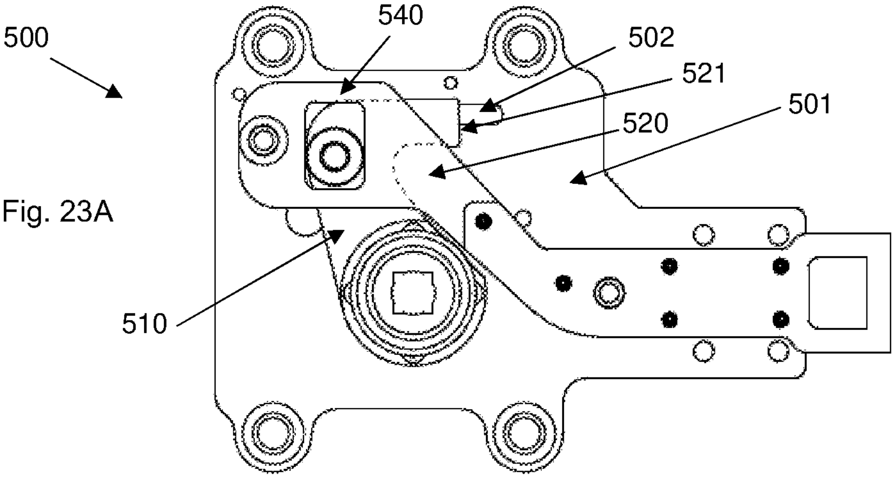
FIGS. 23A and 23B are plan views of the interface assembly similar to that of FIG. 13 but modified for compatibility with gating assembly of FIG. 22.
Figure 23B:
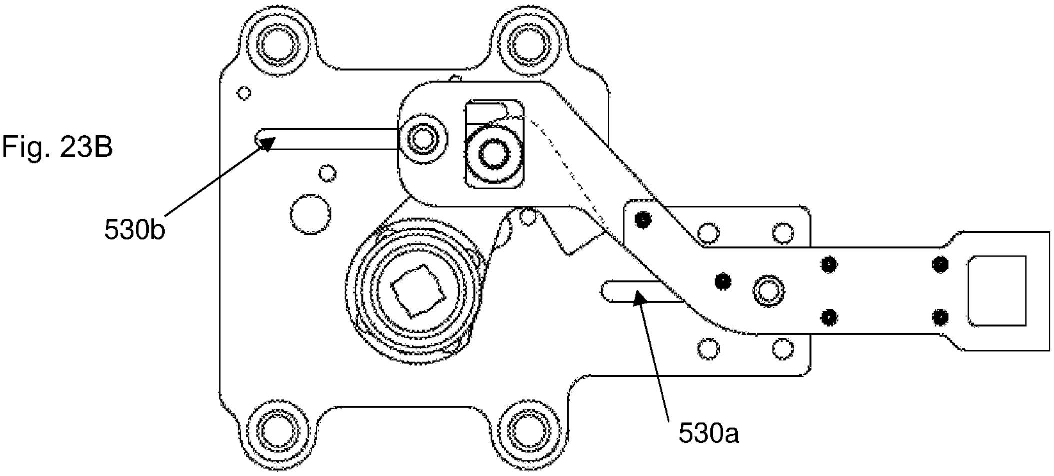

The action slider has a longitudinal axis of motion through the centre of the action slider and the longitudinal axis of motion is coincident on the rotation axis of the cam. The cam is coupled to the action slider by slide arm which may be considered to comprise an offset linkage. Further details of the interface assembly 500 comprising cam 510 and slide arm 520 are shown in FIGS. 23A and 23B. FIGS. 23A and 23B are top plans views of the linkage or interface assembly which may be known as gearbox. FIG. 23A shows the slide arm 520 and cam 510 in positions in which the bolt or bolts of bolting mechanism are thrown. FIG. 23B shows the slide arm 520 and cam 510 in positions in which the bolt or bolts of bolting mechanism are retracted by retraction of the action slider.

As shown in FIGS. 23A and 23B, the interface assembly 500 may comprise one or more parallel first guides 530*a*, 530*b* arranged to guide the linkage to move laterally when driven by the action slider. The guides may comprise lateral slots into which pins or rollers of the slide arm slide. The cam 510 may be sandwiched between two plates and the slots may be provided in the plates. Parallel first guides are shown in FIGS. 23*a* and 23*b* by reference numbers 530*a* and 530*b*. The guide 530*a* may be provided in line with the longitudinal axis of motion of the action slider, for example between the cam 510 and action slider 708. Another guide 530*b* may be provided in the area of movement of the cam lobe. The parallel guides allow the slide arm to move laterally without rotation.

The cam 510 is coupled to slide arm by coupling 540 which many comprise a pin or roller on the cam lobe which is held in slot in slide arm 520. This slot may be considered to be a second guide. The direct of second guide is transverse to the direction of the one or more first guides. The pin or roller on the lobe of the cam is arranged to move along the second guide. As the slide arm 520 is driven laterally the pin or roller of the cam 510 is moved rotating the cam. The second guide accommodates the transverse movement of the pin or roller of cam, which moves in an arc of a circle as it is pushed by the slide arm.

Preferably, the cam 510 is arranged to be rotated by the action slider and slide arm by an angle of less than 90° such as 50-70°, or preferably 55-65°, such as around 60° to move the bolt or bolts from a thrown position to the retracted position. Preferably, this rotation has a mid-point on a line transverse to, or more preferably oriented at 90° to, the lateral axis of motion of the action slider. At this position the movement is maximally away from top-dead-centre position of the cam for easiest turning of the cam. To achieve 25 mm of retraction of a bolt of one of the bolting mechanisms mentioned earlier, the bolting mechanism is required to be driven by 57° rotation. Of this, the first 9° may release the deadbolt and 48° retracts the bolt. Hence, the ability to rotate 60° is sufficient to retract the bolts with some misalignment permitted.

Although we have described interface assembly as having a slide arm and cam, other mechanisms for coupling between the touch bar and bolting mechanism are possible.

FIG. 22 shows a perspective view of modified interface assembly or gearbox comprising an electrically driven gating assembly 550 which is configured to selectively block retraction of the bolt or bolts of bolting mechanism. The gating assembly 550 performs the gate function set out in FIG. 17. The gating assembly 550 comprises a motor 553, such as a stepper motor, mounted having an axis of rotation transverse to the rotation axis of cam 510. The motor 553 is mounted to one of the plates 501 of interface assembly by bracket 552. Motor 553 is configured to rotate blocking rotor 554. Although we describe a motor, other actuators such as pneumatic or hydraulic actuators may be used instead. The gating assembly further comprises a blocking finger 555 and blocking rotor 554. The blocking finger 555 is an elongate member pivoted close to one end, for example, at pivot 556. The blocking finger is arranged to be rotated into the path of cam 510 of the interface assembly. By driving the blocking finger 555 into the path of the drive cam, retraction of the bolt or bolts of the bolting mechanism by the touch bar may be blocked. The blocking finger is biased, such as by coiled spring 557, out of the path of the drive cam 510. Blocking rotor 554 is configured to be driven by motor 553. For example, blocking rotor 554 may be mounted on spindle or shaft of motor 553.

FIG. 24A is a top plan view of the modified interface assembly. FIG. 24B is a side view of the modified interface assembly looking towards the motor 553 and blocking rotor 554. FIG. 24C is section view taken through line B-B of FIG. 24A through blocking rotor and viewed end on. As shown in FIGS. 24B and 24C the blocking rotor 554 has a first flat blocking surface 554*a*, a pocket or recess 554*b* and a stopping member 554*c*. Blocking finger 555*a* has second flat blocking surface 555*a*. At the opposite end of blocking finger 555 is a projection 555*p* which blocks the path of drive cam 510. FIG. 24B includes an enlarged view of the stopping rotor and stopping finger. FIG. 24C also includes an enlarged view of the projection 555*p*. In this modified interface assembly the drive cam 510 is also modified such that the cam has a hook shape as shown by the dashed lines of FIGS. 23A and 23B. The cam lobe is extended at an angle of approximately 60° to the lobe direction, with the hook shape having an end surface 521 parallel to the radius of the cam. As shown in FIG. 23A, when the action slider is in the thrown position, the end surface is transverse or perpendicular to the lateral axis of motion of the action slider.

Figure 25A:
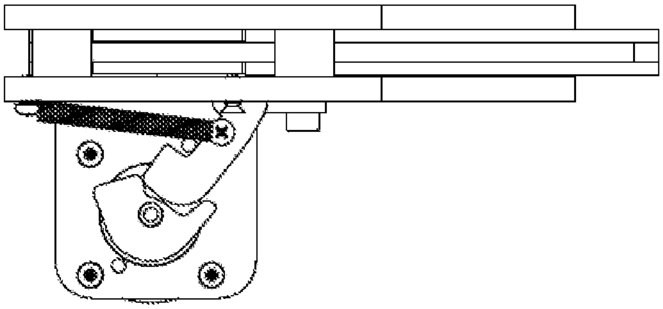
FIGS. 25A and 25B are respectively a side view and a section view of the modified interface assembly of FIG. 22, with the blocking rotor of the gating assembly moved so that it is not in the blocking position.
Figure 25B:
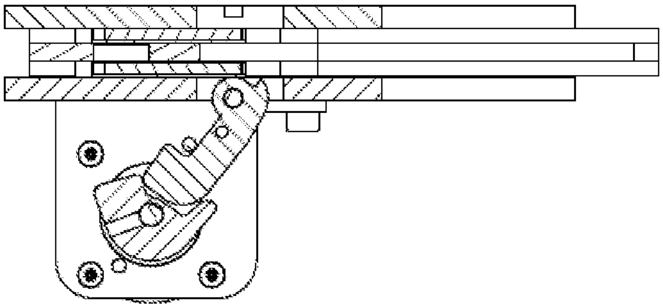

In FIG. 24A-24C, the blocking rotor and blocking finger are in the blocking position preventing rotation of drive cam 510. FIGS. 25A and 25B respectively show a side view and section view corresponding to those of FIGS. 24B and 24C, but with the blocking rotor and blocking finger moved to a position allowing movement of the drive cam 510. We will now describe operation of the gating assembly 550 of the modified interface assembly.

In FIGS. 24A and 24B the blocking has been rotated by motor 553 until the stopping member hits pin 552*a* attached to bracket 552. At the position this first flat blocking surface 554*a* of the blocking rotor 554 is butted against second flat blocking surface 555*a* of blocking finger 555. The blocking finger is rotated against the bias of spring 557 and the protrusion 555*p* at end of blocking finger moves through hole 502 in one the plates 501 of the interface assembly into path of drive cam 510. The protrusion 555*p* sits against end surface 521 of hook shape of drive cam 510 stopping the drive cam from being driven. In FIGS. 25A and 25B the protrusion 555*p* at the end of the blocking finger has moved out of the path of the drive cam 510 such that the drive cam can be driven by the action slider to retract the bolts of the bolting mechanism. To retract the blocking finger 555 out of the path of the drive cam, the motor is driven to turn blocking rotor 554 such that the stopping member moves away from pin 552*a* attached to bracket 552. As this happens the first and second flat blocking surfaces are no longer butted against each but with respect to each other such that an angle opens up between the flat faces similar to a book opening. The end of finger 444 then moves into pocket 554*b* of blocking rotor 554. While the blocking rotor is moving it rotates about pivot 556 under bias of spring 557 such that the protrusion 555*p* lifts out of the path of the drive cam 510.

The positioning of the contact point between the blocking rotor and blocking finger can provide advantages as we will now explain in relation to the enlarged view in FIG. 24B. The motor may be stepper motor and may preferably have a brake to stop rotation of the shaft of the motor. Brakes on motors are only effective up to a certain rotational force on the shaft. Beyond this the braking action is overcome and the shaft may be rotated. In the present application it is preferable that the braking is not overcome before the safety springs are fully compressed.

Referring to the enlarged view of FIG. 24B, as the touch bar is depressed, the action slider pushes up against blocking finger 555 (for convenience labelled “1” in the enlarged view) and will try to force it to rotate in a clockwise direction. (Blocking rotor is labelled “2” for convenience). The arc drawn as a dotted line is drawn through the contact point of finger “1” and rotor “2” immediately before the flat surface surfaces come together. Although the two flat surfaces are in contact when in the blocking position, a force from the action slider would try to rotate finger and rotor about the contact point. The dashed line shows that the contact point and direction of force through the contact point is just above the axis of blocking rotor “2”. The closer the contact point is to the axis of rotor “2”, the more fore is required to turn the rotor. For example, if the contact point and force direction is through the axis, this is known as top-dead-centre, and if held precisely no amount of force will be able to turn rotor. In the present case the contact point and force direction is slightly offset from the axis so the rotor can be turned but a large force is required. This offset below top-dead-centre means that there is mechanical advantage to the brake. That is, the force required to overcome the brake is increased by the mechanical advantage of being close to top-dead-centre. When the brake is released the blocking finger may be moved from the blocking position when the touch bar is depressed or by the bias of spring 557. Please note that the electronic brake and additional mechanical advantage only has to be strong enough to allow the safety spring(s) to fully compress. With the brake removed, the overriding action has to be light enough to operate without the safety spring(s) compressing.

As shown in FIG. 24B, in the blocking position the stopping member 554*c* of the stopping rotor is driven against pin 552*a*. This is driven by motor 553. Brake is built into the back of the motor. When the rotor hits the pin the motor will feel resistance preventing it driving it further which will increase the load in the motor. Electronics in the touch bar assembly monitors this and when the current exceeds a threshold, the electronics stops the motor and applies the brake.

FIGS. 26 and 27 show operation of the rear motor which is provided to retract the action slider. FIG. 26A is a perspective view of the rear motor and associated components and its coupling to the action slider. The rear motor 220' may be similar to the motor 220 shown in FIGS. 5A-5C. Rear motor may be a stepper motor and may rotate a threaded rod 230' similar to the arrangement of FIGS. 5*a*-5*c*. Threaded rod 230' passes through threaded hole in carriage 810. Hence, when motor rod 230' is rotated the carriage 810 is driven backwards and forwards. Carriage 810 is coupled to action slider 708 and in particular to transmitting portion of action slider 708*t* by coupling 840. Coupling comprises slots 850 into which carriage rod 820 slide. A guide frame 870 is provided which supports carriage rod 820. Carriage rod is driven by the movement of carriage 810 by motor. Carriage rod is guided by slots in coupling 840 and also through slots 830 in guide frame 870. FIGS. 26B and 26C are sectional views taken through cross-sections corresponding to the cross-sections X-X and Y-Y of FIG. 5A. In FIGS. 26A-26C the touch bar and cranks 210' are in the thrown or extended position. The use of the rear motor and the motor 553 for the interface assembly are found to use less current than when a single motor is provided to perform all the functions.

Figure 27A:
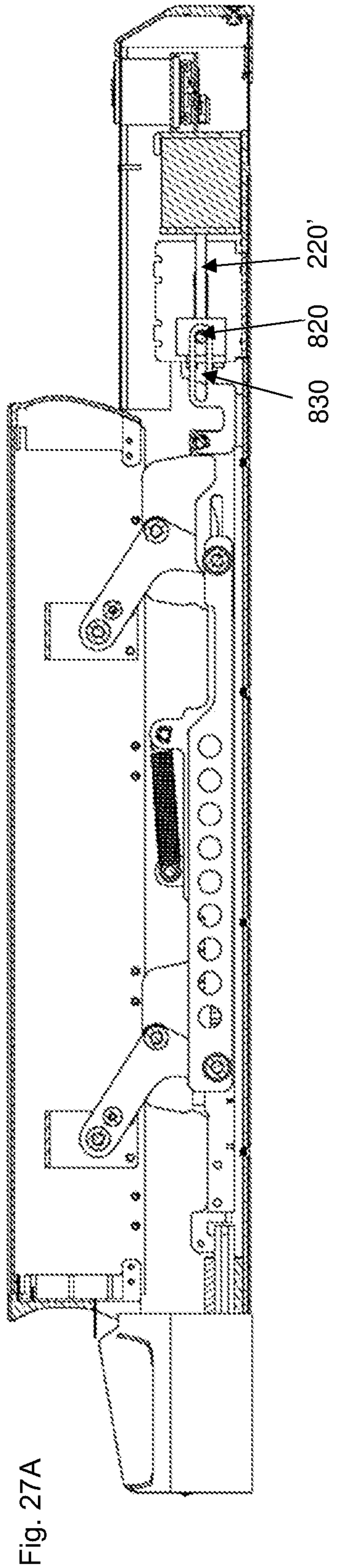
FIGS. 27A-27C are sectional views of the embodiment of FIG. 18 showing operation of rear motor.
Figure 27B:
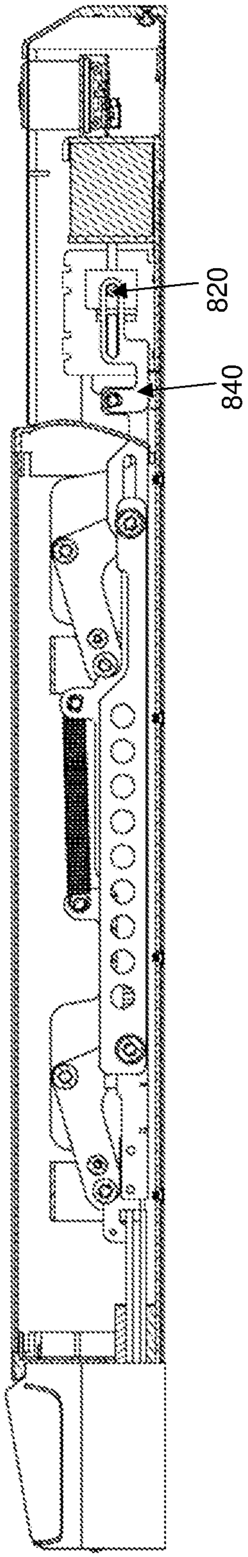
Figure 27C:
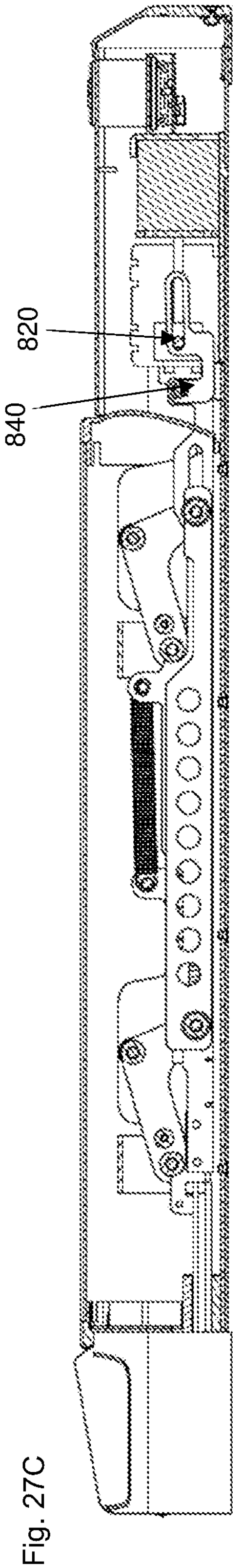

FIGS. 27A-27C show operation of the rear motor 220'. In FIG. 27A the touch bar is in the thrown position with the cranks 210' pointing upwards. In FIG. 27*b* the motor 220' has rotated motor rod 230' retracting carriage 810. The retraction of carriage 810 has moved carriage rod along slot 850 in coupling 840. The rod reaches the end of the slot 850 and continued driving by the motor 220' pulls carriage rod and coupling towards motor. The retraction of coupling 840 towards motor 220' pulls action slider towards motor retracting the touch bar and action slider and releasing the bolts of bolting mechanism. After retraction and release of the bolts the motor returns the carriage to the position in FIG. 27A, which may be considered to be a neutral position. FIG. 27C shows that the motor does not interfere with manual pushing of the touch bar by a user to retract the bolts. In FIG. 27C the touch bar has been manually pushed by a user, the cranks 210' have rotated and the action slider has moved to retract the bolts of the bolting mechanism. In doing so the action slider moves towards the rear motor and moves coupling towards rear motor. The carriage is in the neutral position the same as in FIG. 27A. The coupling is able to move the towards the motor and slot 830 moves along carriage rod. Hence, the slot provides lost-motion between the carriage rod and coupling by allowing the motor to drive the carriage but also to allow the action slider to be driven manually without requiring movement of the carriage or motor rod.

FIGS. 26 and 27 also show a key cylinder 860 included. On insertion and rotation of a matching key the key cylinder actuates a microswitch which sends a signal instructing the controlling electronics to activate or deactivate the delayed egress function and/or motorised function. The signal from the microswitch may also be used to de-activate an alarm system connected to the door. Instead of key cylinder, an access control system could be provided which on receipt of an authorised access card or an access code send signal to motor to retract the action slider.

Of course, if the blocking rotor blocks retraction of the action slider then actuation of the rear motor will have no effect and may damage the rear motor. Hence, electronic control may first check sensors to detect the position of blocking rotor before driving the rear motor.

In embodiments neither the blocking rotor and rear motor drive may be included to provide a purely mechanical touch bar assembly. In such an arrangement blocking of the retraction of the bolts may be provided by a deadlock of the bolting mechanism. Each of the blocking rotor and rear motor may be retrofitted to a mechanical only version.

Figure 28:
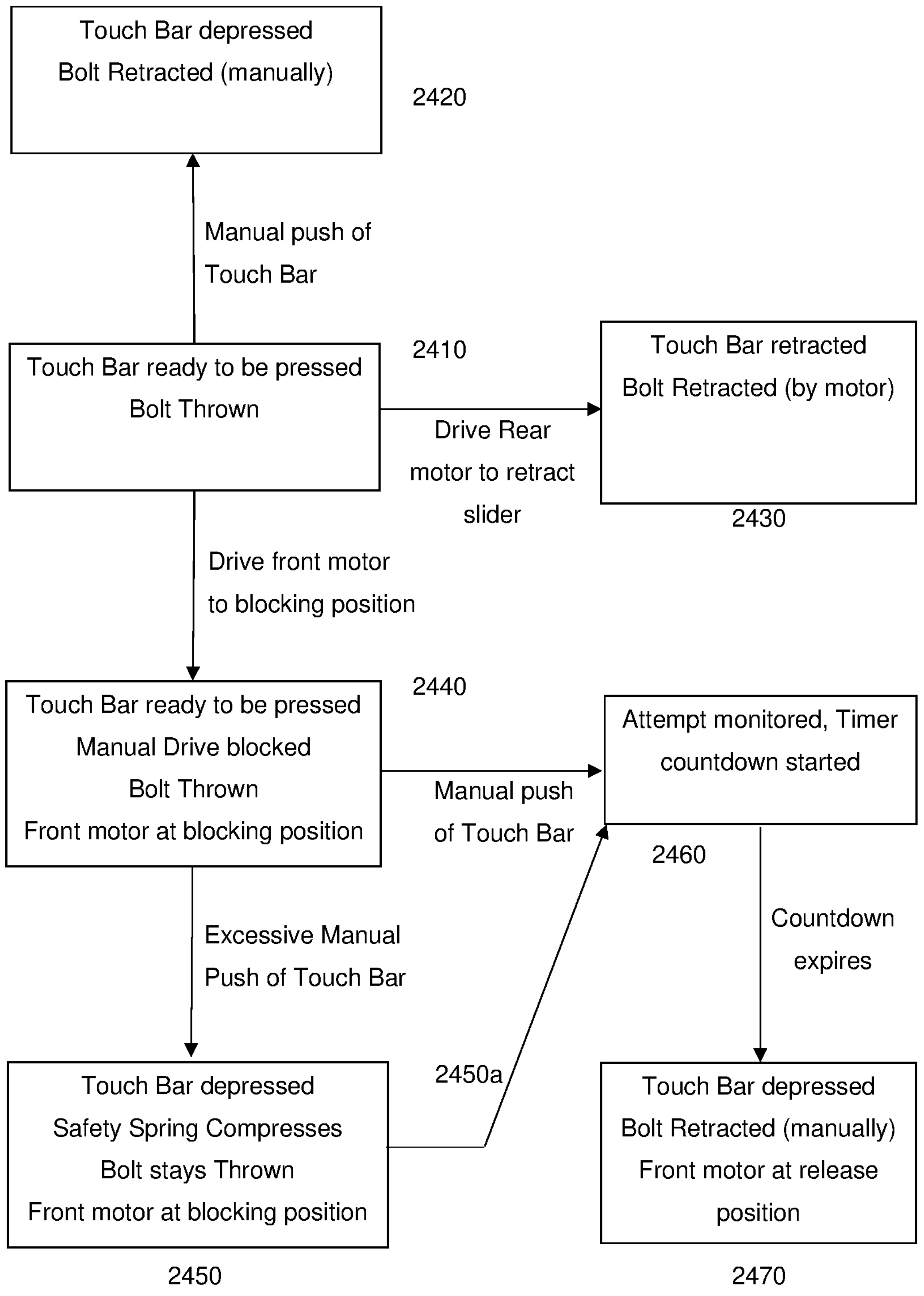
FIG. 28 is a flow diagram showing the different operation steps of the touch bar assembly according to the embodiment of FIGS. 15 to 27 described herein.

FIG. 28 is a flow diagram showing the different operation steps of the touch bar assembly according to FIGS. 15 to 27 described herein. Block 2410 represents the touch bar is in the thrown or extended position and the bolts of the bolting mechanism are likewise thrown. At block 2420 the touch bar has been manually depressed and the bolts are retracted. Alternatively, as shown at block 2430 instead of retracting the bolts by manual depression of the touch bar they can be retracted by operation of the rear motor to move the action slider and retract the bolts. Returning to block 2410, the front motor or motor of gating assembly may be driven to move the blocking rotor to the blocking position at block 2440. If strong or excessive manual force pushing the touch bar occurs then the safety spring compresses moving to block 2450. At block 2450 the bolts stay thrown and the blocking rotor of gating assembly prevents retraction of the bolts. Returning to the blocking position at 2440, if a manual attempt at pushing the touch bar occurs, this may be detected and start a timer for delayed egress at 2360. When the countdown expires, the blocking may be released and further pushing of the touch bar retracts the bolts at 2470. As indicated by arrow 2450*a*, the strong or excessive manual force at 2450 may also be monitored as an attempt to release the touch bar, such that this also starts the timer countdown at 2460 for delayed egress. Movement back through the blocks is achieved by reversing the steps shown.

The person skilled in the art will readily appreciate that various modifications and alterations may be made to the above described methods and apparatus. The parts may take different forms and sizes from those shown. Alternative biasing or spring means may be provided and the precise locations of parts in the assembly may be changed. When we refer to the bolting mechanism this may comprise one or multiple bolts. The modifications may be made without departing from the scope of the appended claims.

Embodiments of the present invention are provided in the following clauses:

Clause A1. A touch bar assembly for releasing a bolt, the touch bar assembly comprising:

a touch bar for actuation by a user;

an action slider coupled to the touch bar for retracting the bolt;

a motor arranged to drive a motor rod between a retracted position, a neutral position and a blocking position, the motor rod coupled to the action slider by a coupling comprising a gate, wherein movement of the motor rod from the neutral position to the blocking position moves the gate to a blocking configuration blocking retraction of the action slider, and the coupling couples motion of the motor rod from the neutral position to the retracted position into retraction of the action slider to retract the bolt.

Clause A2. The touch bar assembly of clause A1, wherein movement of the motor rod from the blocking position to the neutral position moves the gate to an open position releasing the action slider for retraction of the bolt.

Clause A3. The touch bar assembly of clause A1 or clause A2, wherein the motor comprises a brake to prevent movement of the motor rod when in the blocking position.

Clause A4. The touch bar assembly of clause A3, wherein the gate is arranged such that in the blocking configuration a force on the action slider resulting from a force applied to the touch bar is reduced by the gate to reduce the force transmitted from the action slider to the motor rod.

Clause A5. The touch bar assembly of any of clauses A1 to A4, wherein the gate comprises a stopping bar, the gate configured such that in the blocking configuration the stopping bar blocks movement of the action slider.

Clause A6. The touch bar assembly of clause A5, wherein the stopping bar slides in a slot and is biased away from a blocking configuration.

Clause A7. The touch bar assembly of clause A6, wherein the action slider is configured to move in a first direction as its retracts the bolt, the slot restricts the direction of movement of the stopping bar and is angled to be less than 90° transverse to the first direction.

Clause A8. The touch bar assembly of clause A7, wherein the slot is angled between 6° and 85°, or more preferably between 70° and 80°, or even more preferably around 75°, transverse to the first direction.

Clause A9. The touch bar assembly of any of clauses A5 to A8, wherein the action slider comprises a blocking surface against which the stopping bar bears in the blocking configuration.

Clause A10. The touch bar assembly of any of clauses A5 to A9, wherein the coupling comprises a carriage coupled to the motor rod and the action slider, the carriage having a driving surface arranged such that on moving the motor rod to the blocking configuration the driving surface bears against the stopping bar to move the gate to a blocking configuration.

Clause A11. The touch bar assembly of clause A10, wherein the driving surface is a ramp surface arranged to pull the stopping bar down to block retraction of the action slider as the motor rod pushes the carriage and moves to the blocking position.

Clause A12. The touch bar assembly of clause A11, wherein the ramp surface has an angle of between 25° and 45° to the movement direction of the action slider.

Clause A13. The touch bar assembly of clause A12, wherein the ramp surface has an angle of between 30° and 40°, or more preferably around 35° to the movement direction of the action slider.

Clause A14. The touch assembly of any of clauses A10 to A13, wherein the carriage couples motion of the motor rod from the neutral position to the retracted position to pull on the action slider to retract the bolt.

Clause A15. The touch assembly of any of clauses A10 to A14, wherein the coupling is configured with lost motion between the carriage and the action slider such that movement of the action slider by actuation of the touch bar does not move the motor rod.

Clause A16. The touch assembly of clause A14, wherein the lost motion is provided by a rod of the carriage moving in a slot of the action slider.

Clause A17. The touch assembly of any of clauses A10 to A16, wherein the carriage comprises a channel in which the action slider extends.

Clause A18. The touch bar assembly of any of clauses A10 to A17, wherein the motor rod is biased to move from the blocking position to the neutral position.

Clause A19. The touch bar assembly of any of clauses A1 to A18, wherein the action slider is coupled to the touch bar by cranks, the cranks configured such that on pushing the touch bar the cranks rotate to translate the action slider.

Clause A20. The touch bar assembly of any of clauses A1 to A19, wherein the action slider comprises a receiving portion coupled to the touch bar to receive a driving force from a user applied at the touch bar, the action slider further comprises a transmitting portion coupled to the coupling for movement by the motor rod, and wherein the action slider comprises one of more safety springs between the receiving portion and transmitting portion, the safety springs arranged to absorb the user force when the gate is in the blocking configuration.

Clause A21. The touch bar assembly of any of clauses A1 to A20, further comprising the bolt or a bolting mechanism including the bolt.

Clause B22. A door comprising the touch bar assembly of any of clauses A1 to A21.

What is claimed:

1. A touch bar assembly for releasing a bolt, the touch bar assembly comprising:
- a touch bar for actuation by a user;
- an action slider coupled to the touch bar, the action slider configured for lateral motion;
- a cam coupled to the action slider and arranged to couple the lateral motion of the action slider to a rotational motion for driving the bolt between an extended position and a retracted position; and
- a gating assembly arranged to block rotation of the cam and lateral motion of the of the action slider wherein (a) the gating assembly is arranged to be driven by an actuator to drive part of the gating assembly in to the path of the cam to block rotation of the cam and (b) the gating assembly comprises a blocking finger and a blocking rotor, the blocking finger is biased out of the path of the cam and the actuator is a motor configured to drive the blocking rotor to rotate the blocking finger into the path of the cam to block the cam.

2. The touch bar assembly of claim 1, wherein the action slider comprises a receiving portion coupled to the touch bar and arranged to be driven by a driving force from a user applied at the touch bar and a transmitting portion for coupling motion of the action slider to the cam, the action slider further comprising a safety spring between the receiving portion and transmitting portion, the safety spring arranged to absorb user force on the touch bar assembly when retraction of the bolt is blocked.

3. The touch bar assembly of claim 2, wherein the receiving portion is coupled to the touch bar at two positions spaced apart along the length of the receiving portion.

4. The touch bar assembly of claim 2, wherein the safety spring has a spring rate of 10-20 N/mm.

5. The touch bar assembly of claim 2, wherein the receiving portion of the action slider has a channel in which the transmitting portion is configured to slide.

6. The touch bar assembly of claim 5 wherein the transmitting portion is formed with a channel having a U-shaped cross-section and the receiving portion is formed with a pair of plates or beams configured to move parallel to the channel.

7. The touch bar assembly of claim 2, wherein the safety spring is comprised in a channel in the transmitting portion.

8. The touch bar assembly of claim 2, wherein the touch bar is movable from an extended position to a depressed position, the touch bar assembly further comprising a return spring to bias the touch bar to return the touch bar from the depressed position to the extended position, and wherein the safety spring is stronger than the return spring.

9. The touch bar assembly of claim 1, further comprising a housing, wherein the touch bar is coupled to the action slider by cranks arranged to rotate at pivots on the housing.

10. The touch bar assembly of claim 9, wherein the cranks are pivotably coupled at first ends to the touch bar and at second ends to the action slider, the pivotable couplings to the touch bar, action slider and housing arranged in an L-shape formation, wherein the distance from the pivotable coupling to the housing to the pivotable coupling to the touch bar is greater than a distance from the pivotable coupling to the housing to the pivotable coupling to the action slider.

11. The touch bar assembly of claim 10, wherein the ratio of the distance from the pivotable coupling to the housing to the pivotable coupling to the touch bar and the distance from the pivotable coupling to the housing to the pivotable coupling to the action slider is greater than 1.5.

12. The touch bar assembly of claim 10, wherein the L-shape formed by the pivotable couplings to the touch bar, action slider and housing is an L-shape having an angle of greater than 85°.

13. The touch bar assembly of claim 1, wherein the cam is configured such that rotation of the cam drives rotation of the bolting mechanism by a spindle coupled through the cam to the bolting mechanism.

14. The touch bar assembly of claim 1, wherein the action slider has a longitudinal axis of motion through the center of the action slider and the longitudinal axis of motion is coincident on a rotation axis of the cam.

15. The touch bar assembly of claim 1, wherein a slide arm, coupling the cam to the action slider, forms an offset linkage, and further comprising one or more parallel first guides arranged to guide the slide arm to move laterally when driven by the action slider, and the slide arm comprising a second guide transverse to the one or more first guides, a lobe of the cam having a pin or roller arranged to move along the second guide as the slide arm, driven by lateral movement of the action slider, rotates the cam.

16. The touch bar assembly of claim 15, wherein the slide arm is configured to slide between two plates and the one or more parallel first guides in the plates.

17. The touch bar assembly of claim 1, wherein the cam is arranged to be driven by the action slider to rotate by an angle of 50-70° to move the bolt from a thrown position to the retracted position.

18. The touch bar assembly of claim 1, wherein the cam is arranged to be driven through a transverse position in which the cam is oriented transversely to a lateral axis of motion of the action slider.

19. The touch bar assembly of claim 1, wherein the motor is a stepper motor comprising a brake to stop the motor from rotating.

20. The touch bar assembly of claim 1, wherein the blocking finger is arranged to rotate about a pivot positioned between the blocking rotor and the cam, the blocking rotor having a first flat blocking surface and the blocking finger have a second flat blocking surface, wherein the blocking rotor is configured to be rotated by the motor to pivot the blocking finger and push the first flat blocking surface of the blocking rotor to butt against the second flat blocking surface of the blocking finger.

21. The touch bar assembly of claim 20, wherein when the flat blocking surfaces move apart there is a contact point or line on the blocking rotor at which the stopping finger contacts the blocking rotor, the contact point and direction of force through the contact point offset from the axis of stopping rotor by a distance of less than half the mean radius of the rotor.

22. The touch bar assembly of claim 1, comprising a first motor for driving a gating or blocking action to selectively block rotation of the cam and a second motor for driving the lateral movement of the action slider.

23. The touch bar assembly of claim 22, wherein the first motor and second motors are arranged at opposite ends of the touch bar assembly.

24. The touch bar assembly of claim 1, further comprising an electrically or pneumatically powered retraction actuator coupled to the action slider for driving the action slider to a retracted position for retraction of the bolt.

25. The touch bar assembly of claim 24, wherein the cam is driven at a first end of the action slider and the retraction actuator is coupled to a second end of the action slider opposite to the first end.

26. The touch bar assembly of any of claim 24, wherein the retraction actuator is a motor which drives a motor rod between an extended position and a retracted position, wherein the motor rod is configured to retract the action slider to retract the bolt.

27. The touch bar assembly of claim 26, further comprising a lost-motion coupling between the motor rod and action slider, the lost motion coupling comprising a carriage rod guided by a slot, the carriage rod arranged to be driven by the motor rod to move the action slider between an extended and retracted position, the slot and carriage rod having lost-motion there between such that when the action slider is in the extended position, the action slider and carriage rod are configured to be driven to the retracted position by user force on the touch bar.

28. A door comprising the touch bar assembly of claim 1.

* * * * *